United States Patent
Briggs et al.

(10) Patent No.: US 10,531,253 B1
(45) Date of Patent: Jan. 7, 2020

(54) ROADSIDE ASSISTANCE

(71) Applicant: Allstate Insurance Company, Northbrook, IL (US)

(72) Inventors: Ryan M. Briggs, Glen Ellyn, IL (US); Tara Cavallaro Kozlowski, Geneva, IL (US); Imran Iqbal, Hoffman Estates, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/417,040

(22) Filed: May 20, 2019

Related U.S. Application Data

(60) Division of application No. 15/398,256, filed on Jan. 4, 2017, now Pat. No. 10,382,900, which is a continuation of application No. 15/058,371, filed on Mar. 2, 2016, now Pat. No. 9,584,967, which is a continuation of application No. 13/446,192, filed on Apr. 13, 2012, now Pat. No. 9,384,491, which is a continuation-in-part of application No. 12/859,627, filed on Aug. 19, 2010, now Pat. No. 9,070,243, and a continuation-in-part of application No. 12/859,634, filed on Aug. 19, 2010, now Pat. No. 8,645,014.

(60) Provisional application No. 61/475,316, filed on Apr. 14, 2011, provisional application No. 61/255,349, filed on Oct. 27, 2009, provisional application No. 61/235,217, filed on Aug. 19, 2009.

(51) Int. Cl.
*H04W 4/40* (2018.01)
*H04W 4/18* (2009.01)
*H04W 4/02* (2018.01)

(52) U.S. Cl.
CPC ............... *H04W 4/40* (2018.02); *H04W 4/02* (2013.01); *H04W 4/18* (2013.01)

(58) Field of Classification Search
USPC ........................................................ 235/375
See application file for complete search history.

(56) References Cited

U.S. PATENT DOCUMENTS

| | | |
|---|---|---|
| D426,206 S | 6/2000 | Richter |
| D434,419 S | 11/2000 | Bomze et al. |
| 6,233,563 B1 | 5/2001 | Jefferson et al. |

(Continued)

FOREIGN PATENT DOCUMENTS

| | | |
|---|---|---|
| CN | 101252627 A | 8/2008 |
| EP | 1320004 A1 | 6/2003 |

OTHER PUBLICATIONS

Allstate Motor Club Launches Roadside Assistance Mobile App for iPhone and BlackBerry Users, Oct. 27, 2009; hittp://money.cnn.com/news/newsfeeds/articles/prnewswire/2009102711, 2 pages.

(Continued)

*Primary Examiner* — Rafferty D Kelly
(74) *Attorney, Agent, or Firm* — Banner & Witcoff, Ltd.

(57) ABSTRACT

A mobile computerized apparatus configured to provide membership status in a roadside assistance program after occurrence of a roadside event is disclosed. The apparatus executes instructions that cause/allow the apparatus to receive input related to an electronic membership card, retrieve from a data store membership information associated with the vehicle, and dynamically update the electronic membership card for display on the apparatus.

20 Claims, 21 Drawing Sheets

(56) References Cited

U.S. PATENT DOCUMENTS

| | | |
|---|---|---|
| 6,298,229 B1 | 10/2001 | Tomlinson, Jr. et al. |
| D453,767 S | 2/2002 | Istvan et al. |
| 6,415,226 B1 | 7/2002 | Kozak |
| D464,660 S | 10/2002 | Weng et al. |
| 6,493,629 B1 | 12/2002 | Van Bosch |
| 6,522,265 B1 | 2/2003 | Hillman et al. |
| D474,479 S | 5/2003 | Tambata |
| D474,780 S | 5/2003 | Tambata |
| D475,719 S | 6/2003 | Horie |
| 6,677,854 B2 | 1/2004 | Dix |
| 6,726,107 B1 | 4/2004 | Ruth |
| 6,745,153 B2 | 6/2004 | White et al. |
| D495,338 S | 8/2004 | Peter et al. |
| 6,771,742 B2 | 8/2004 | McCalmont et al. |
| 6,847,825 B1 | 1/2005 | Duvall et al. |
| D517,087 S | 3/2006 | Sands |
| 7,012,993 B2 | 3/2006 | Alton |
| 7,024,205 B1 | 4/2006 | Hose |
| 7,027,808 B2 | 4/2006 | Wesby |
| D522,015 S | 5/2006 | Cummins et al. |
| D523,442 S | 6/2006 | Hiramatsu |
| 7,068,994 B2 | 6/2006 | Van Camp |
| 7,091,903 B2 | 8/2006 | Kim |
| 7,092,695 B1 | 8/2006 | Boling et al. |
| 7,099,835 B2 | 8/2006 | Williams, III |
| D529,507 S | 10/2006 | Cummins |
| D529,510 S | 10/2006 | Cummins et al. |
| 7,119,669 B2 | 10/2006 | Lundsgaard et al. |
| 7,130,406 B2 | 10/2006 | Pines et al. |
| 7,142,959 B2 | 11/2006 | Oesterling et al. |
| 7,155,335 B2 | 12/2006 | Rennels |
| 7,167,796 B2 | 1/2007 | Taylor et al. |
| 7,174,243 B1 | 2/2007 | Lightner et al. |
| 7,215,965 B2 | 5/2007 | Fournier et al. |
| D544,871 S | 6/2007 | Lim et al. |
| 7,236,576 B2 | 6/2007 | Schnarel et al. |
| 7,242,966 B1 | 7/2007 | Averkamp |
| D550,689 S | 9/2007 | Vigesaa |
| 7,266,435 B2 | 9/2007 | Wang et al. |
| D553,146 S | 10/2007 | Byeon et al. |
| 7,289,786 B2 | 10/2007 | Krasner |
| D556,770 S | 12/2007 | O'Donnell et al. |
| D560,226 S | 1/2008 | Jung et al. |
| 7,323,973 B1 | 1/2008 | Ceglia et al. |
| D561,191 S | 2/2008 | Haning et al. |
| 7,336,172 B2 | 2/2008 | Govindaraj |
| D563,975 S | 3/2008 | Vigesaa |
| D564,541 S | 3/2008 | Lettau et al. |
| 7,343,565 B2 | 3/2008 | Ying et al. |
| D565,581 S | 4/2008 | Gunn et al. |
| 7,389,244 B2 | 6/2008 | Kaplan |
| 7,405,537 B2 | 7/2008 | Hoffman et al. |
| D574,842 S | 8/2008 | Kwag et al. |
| D575,302 S | 8/2008 | Millar et al. |
| 7,421,321 B2 | 9/2008 | Breed et al. |
| D578,134 S | 10/2008 | Jasinski |
| D579,946 S | 11/2008 | Lee et al. |
| 7,457,693 B2 | 11/2008 | Olsen et al. |
| 7,460,019 B2 | 12/2008 | Henderson |
| 7,463,951 B2 | 12/2008 | Ampunan et al. |
| 7,480,546 B2 | 1/2009 | Kamdar et al. |
| D586,355 S | 2/2009 | Mori et al. |
| 7,487,111 B2 | 2/2009 | Shoen et al. |
| 7,499,714 B2 | 3/2009 | Ki |
| D592,223 S | 5/2009 | Neuhaus |
| D593,110 S | 5/2009 | Danton |
| D593,111 S | 5/2009 | Danton |
| D594,465 S | 6/2009 | Hong et al. |
| D594,468 S | 6/2009 | Bamford et al. |
| 7,593,855 B1 | 9/2009 | Craig |
| 7,602,388 B2 | 10/2009 | Plut |
| D605,657 S | 12/2009 | Danton |
| D607,464 S | 1/2010 | Tang et al. |
| D608,366 S | 1/2010 | Matas |
| D611,056 S | 3/2010 | Langlois et al. |
| D618,249 S | 6/2010 | Ahn et al. |
| D618,696 S | 6/2010 | Woods et al. |
| D618,700 S | 6/2010 | Song |
| D618,702 S | 6/2010 | Lee |
| D621,849 S | 8/2010 | Anzures et al. |
| D623,555 S | 9/2010 | Reithlingshoefer et al. |
| D624,556 S | 9/2010 | Chaudhri |
| D624,589 S | 9/2010 | Robbins |
| 7,802,722 B1 | 9/2010 | Papierniak et al. |
| D625,312 S | 10/2010 | Jewitt et al. |
| 7,813,980 B2 | 10/2010 | Crockett |
| D631,889 S | 2/2011 | Vance et al. |
| D642,194 S | 7/2011 | Kozlowski et al. |
| D645,051 S | 9/2011 | Kozlowski et al. |
| 8,140,358 B1 | 3/2012 | Ling et al. |
| 8,285,571 B2 | 10/2012 | Demirdjian et al. |
| 8,289,171 B2 | 10/2012 | Morley |
| 8,315,792 B2 | 11/2012 | Speier et al. |
| 8,606,512 B1 | 12/2013 | Bogovich et al. |
| 8,645,014 B1 | 2/2014 | Kozlowski et al. |
| 8,750,902 B2 | 6/2014 | Xiao et al. |
| 8,781,657 B2 | 7/2014 | Pebbles |
| 8,799,034 B1 | 8/2014 | Brandmaier et al. |
| 8,805,603 B1 | 8/2014 | Cavallaro Kozlowski et al. |
| 8,805,707 B2 | 8/2014 | Schumann, Jr. et al. |
| 9,384,491 B1 | 7/2016 | Briggs |
| 9,406,228 B1 | 8/2016 | Kozlowski et al. |
| 9,412,130 B2 | 8/2016 | Wasserman et al. |
| 9,659,301 B1 | 5/2017 | Briggs et al. |
| 9,684,924 B2 | 6/2017 | Wasserman et al. |
| 9,697,525 B1 | 7/2017 | Kozlowski et al. |
| 9,881,268 B1 | 1/2018 | Briggs et al. |
| 2002/0055861 A1 | 5/2002 | King et al. |
| 2002/0065703 A1 | 5/2002 | Garg |
| 2002/0073012 A1* | 6/2002 | Lowell ............... G06Q 30/0601 705/37 |
| 2002/0096561 A1 | 7/2002 | Sullivan |
| 2002/0184653 A1 | 12/2002 | Pierce |
| 2003/0088347 A1 | 5/2003 | Ames |
| 2004/0024711 A1 | 2/2004 | Camping et al. |
| 2004/0100479 A1 | 5/2004 | Nakano et al. |
| 2004/0111195 A1 | 6/2004 | Vries et al. |
| 2004/0192336 A1 | 9/2004 | Walby |
| 2004/0203850 A1 | 10/2004 | Oesterling |
| 2004/0221239 A1 | 11/2004 | Hachigian et al. |
| 2005/0027438 A1 | 2/2005 | Rockett et al. |
| 2005/0071052 A1 | 3/2005 | Coletrane et al. |
| 2005/0091272 A1 | 4/2005 | Smith et al. |
| 2005/0187833 A1 | 8/2005 | Royer et al. |
| 2005/0197771 A1 | 9/2005 | Seick et al. |
| 2005/0261986 A1 | 11/2005 | Haynes et al. |
| 2006/0022846 A1 | 2/2006 | Tummala |
| 2006/0123360 A1 | 6/2006 | Anwar et al. |
| 2006/0245570 A1 | 11/2006 | Pfleging et al. |
| 2006/0247852 A1 | 11/2006 | Kortge et al. |
| 2006/0291633 A1 | 12/2006 | Glaza et al. |
| 2007/0011278 A1 | 1/2007 | Nou |
| 2007/0033540 A1 | 2/2007 | Bridges et al. |
| 2007/0066276 A1 | 3/2007 | Kuz et al. |
| 2007/0072625 A1 | 3/2007 | Fournier et al. |
| 2007/0088473 A1 | 4/2007 | Moon et al. |
| 2007/0122026 A1 | 5/2007 | Ersue et al. |
| 2007/0135990 A1 | 6/2007 | Seymour et al. |
| 2007/0139182 A1 | 6/2007 | O'Connor et al. |
| 2007/0142026 A1 | 6/2007 | Kuz et al. |
| 2007/0167147 A1 | 7/2007 | Krasner et al. |
| 2007/0185728 A1 | 8/2007 | Schwarz et al. |
| 2007/0240079 A1 | 10/2007 | Flynt |
| 2007/0244628 A1 | 10/2007 | Rockett et al. |
| 2007/0252689 A1 | 11/2007 | Rothschild |
| 2007/0298765 A1 | 12/2007 | Dickinson et al. |
| 2008/0004790 A1 | 1/2008 | Ames |
| 2008/0014908 A1 | 1/2008 | Vasant |
| 2008/0054072 A1 | 3/2008 | Katragadda et al. |
| 2008/0119203 A1 | 5/2008 | Shalmon et al. |
| 2008/0140287 A1 | 6/2008 | Yang et al. |
| 2008/0167937 A1 | 7/2008 | Coughlin et al. |
| 2008/0177653 A1 | 7/2008 | Famolari et al. |
| 2008/0215240 A1 | 9/2008 | Howard et al. |

(56) References Cited

U.S. PATENT DOCUMENTS

| | | | |
|---|---|---|---|
| 2008/0261554 | A1 | 10/2008 | Keller et al. |
| 2008/0319665 | A1 | 12/2008 | Berkobin et al. |
| 2009/0002145 | A1 | 1/2009 | Berry et al. |
| 2009/0072995 | A1 | 3/2009 | Thomas et al. |
| 2009/0093236 | A1 | 4/2009 | Balan et al. |
| 2009/0125178 | A1 | 5/2009 | Wilson |
| 2009/0210142 | A1 | 8/2009 | Couckuyt et al. |
| 2009/0216600 | A1 | 8/2009 | Hill |
| 2009/0233572 | A1 | 9/2009 | Basir |
| 2009/0287527 | A1 | 11/2009 | Kolb et al. |
| 2010/0138242 | A1 | 6/2010 | Ferrick et al. |
| 2010/0161382 | A1 | 6/2010 | Cole |
| 2010/0207787 | A1 | 8/2010 | Catten et al. |
| 2010/0332133 | A1 | 12/2010 | Harris et al. |
| 2011/0082816 | A1 | 4/2011 | Moffett |
| 2011/0213628 | A1 | 9/2011 | Peak et al. |
| 2012/0136743 | A1 | 5/2012 | McQuade et al. |
| 2012/0179363 | A1 | 7/2012 | Pierfelice |
| 2014/0222618 | A1 | 8/2014 | Stamp et al. |
| 2016/0140299 | A1 | 5/2016 | Al Harbi |
| 2016/0232598 | A1 | 8/2016 | Wasserman et al. |
| 2017/0249702 | A1 | 8/2017 | Wasserman et al. |

OTHER PUBLICATIONS

TMC News, ATX Launches Enhanced Automatic Collision Notification for BMW, Jan. 11, 2009, http://tmcnet.com/usubmit/2009/01/11/3905139.htm, 4 pages.

Automotive Fleet, Aug. 2009, vol. 48, No. 9, Charging for Preventable Accidents: What's the Payoff?, Grace Lauron, 4 pages.

Automotive Fleet, May 2009, Bright Ideas Energize Fleet Management, Cindy Brauer and Thi Dao, 5 pages.

Automotive Fleet, Sep. 2009 vol. 48 No. 10, DWT Proven to Increase Accidents, Grace Lauron, 5 pages.

Motorola Demonstrates New Communications System Available in BMW's Global 2005 Model Year Vehicle Line, http://www.virtualizationconference.com/49572/print, 2 pages, retrieved on Feb. 6, 2009.

BMW Assist, Safety & Convenience Services © 2006 BMW of North America, LLC, 16 pages.

Automotive Fleet, Emkay Partners With Networkcar to Launch New Networkfleet Telematics Solution, Apr. 29, 2008, © 2009 Automotive Fleet, 1 page.

Geotab Management by Measurement, Geotab for Insurance Companies © 2008, 1 page.

Cio, High-tech Cars: The Coolest Automotive Technologies, Denise Dubie, Network World, Oct. 5, 2008, http://www.cio.com/article/print/452913, retrieved on Feb. 6, 2009, 2 pages.

Inrix News, INRIX Real-Time Traffic Now Available on Over 75 Navigation and Mobile Devices, Jul. 30, 2007, http://www.inrix.com/news_75Devices_30July2007.asp, retrieved Feb. 6, 2009, 1 page.

ABIresearch, Wireless Connectivity to the Automobile Is Hindered by Lack of Standards and Interoperability, Jul. 31, 2007, http://www.abiresearch.com/abiprdisplayjsp?pressid=894, retrieved on Feb. 6, 2009, 1 page.

When Accidents Happen, Nationwide Mobile App for IPhone is on Your Side, Melanie Broemsen, May 10, 2009, http://www.articlesbase.com/print/909297, retrieved on Jun. 23, 2009, 1 page.

Diagnostic Trouble Codes (DTCs) Powertrain Codes for OBD II (OBD-2) equipped GM vehicles, compiled by Anthony W. Haukap; http://myweb.accessus.net/~090/dtocbd2p.html; retrieved on Jul. 20, 2009, 20 pages.

Automotive Fleet, OnStar Receives Honors at Telematics Update Awards © 2009 Automotive Fleet, http://www.automotive-fleet.com/News/Print/Story/2008/05/OnStarReceives, retrieved on Feb. 6, 2009, 1 page.

Real time traffic broadcast to debut in Australia, http://www.gpsbusinessnews.com, retrieved Feb. 6, 2009 1 page.

ABIresearch, In-Vehicle Infotainment Storage and Networking, Hard Disks, Flash Memory, USB, SD, Bluetooth, UWB, IPod Kits and Other Technologies, http://www.abiresearch.com/producs/market_research/In-Vehicle_Infotainment, retrieved on Feb. 6, 2009, 2 pages.

TechWorld, Pimp your ride: Cool car technology, Denise Dubie (Network World) Jul. 10, 2008; http://www.techworld.com/au/article/262977/pimp_your_ride_cool_car, retrieved on Feb. 6, 2009, 3 pages.

Maya Software Technologies, White Paper, Automotive Telematics—Market Overview and Security Considerations © 2001, 12 pages.

Intomobile, Volkswagen Launches iPhone Optimized Website Featuring Access to Emergency Roadside Assistance, http://www.intomobile.com/2009/03/30/volkswagen-launches-iPhone-optimized-website-featuring-access, retrieved on Jun. 23, 2009, 3 pages.

RepairPal for iPhone, http://repairpal.com/mobile, retrieved Feb. 2, 2009, 13 pages.

TradeVibes, The RepairPal iPhone App is Available! © 2007-2008 Mill River Labs, www.tradevibes.com/news/view/repairpal?article=86228, retrieved on Feb. 2, 2009, 1 page.

Übergizm™, RepairPal: Roadside Assistance from the iPhone, posted Jan. 22, 2009, http://www.ubergizmo.com/15/archives/2009/01/repairpal_roadside_assistance, retrieved on Feb. 2, 2009, 1 page.

Automotive Fleet, Sep. 2009 vol. 48 No. 10, 10 Recommendations: What Drivers Should Do After a Fleet Accident, Mike Antich, 4 pages.

Automotive Fleet/2009 NAFA Planning Guide, NAFA 2009 Institute Expo Advanced Planning Guide, 2 pages.

U.S. Appl. No. 29/396,366 filed Jun. 29, 2011.

U.S. Copyright Registration No. TX 7-150-082, "Mini Road Assist", registered on Mar. 19, 2010.

U.S. Copyright Registration No. TX 7-329-434, "Mini Road Assist", registered on Mar. 19, 2010.

U.S. Copyright Registration No. TX 7-150-080, "Mini Road Assist", registered Mar. 29, 2010.

U.S. Copyright Registration No. TX 7-195-526, "Allstate Motor Club Roadside Assistance", registered Mar. 30, 2010.

U.S. Copyright Registration No. TX 7-229-997, "Allstate Motor Club Roadside Assistance", registered Mar. 19, 2010.

U.S. Copyright Registration No. TX 7-150-076, "Allstate Motor Club Roadside Assistance", registered Mar. 26, 2010.

"Roadside Assistance with Emergency Roadside Service", http://www.geico.com/getaquote/auto/emergency-road-service/, downloaded Feb. 25, 2015, pp. 1-5.

BoatUS Towing App—Free for All Boaters—BoatUS, http://www.boatus.com/towing/app.asp, downloaded Feb. 25, 2015, pp. 1-2.

Jan. 16, 2013—U.S. Non-Final Office Action—U.S. Appl. No. 12/859,634.

Jun. 7, 2013—U.S. Notice of Allowance—U.S. Appl. No. 12/859,634.

Jul. 25, 2012—U.S. Non-Final Office Action—U.S. Appl. No. 12/859,627.

Jan. 15, 2013—U.S. Final Office Action—U.S. Appl. No. 12/859,627.

Software Engineering for Service-Oriented Overlay Computers, D1.4a: UML for Service-Oriented Systems, Sensoria, Oct. 10, 2007, pp. 1-21.

Lapadula, A., COWS Specification of the on Road Assistance Scenario, Dec. 19, 2007, pp. 1-9.

Mar. 23, 2015—U.S. Non Final Office Action—U.S. Appl. No. 13/446,192.

Mar. 23, 2015—U.S. Non Final Office Action—U.S. Appl. No. 13/446,146.

Mar. 13, 2015—U.S. Notice of Allowance—U.S. Appl. No. 12/859,627.

May 26, 2015—U.S. Non-Final Office Action—U.S. Appl. No. 13/446,146.

Feb. 17, 2016—U.S. Notice of Allowance—U.S. Appl. No. 13/446,192.

Mar. 17, 2016—(WO) International Search Report and Written Opinion—U.S. Appl. No. PCT/US16/14044.

May 4, 2016—U.S. Notice of Allowance—U.S. Appl. No. 14/444,247.

Jun. 27, 2016—U.S. Notice of Allowance—U.S. Appl. No. 14/721,689.

Aug. 23, 2016—U.S. Non-Final Office Action—U.S. Appl. No. 13/446,146; KFS does not cite OAs as prior art.

Nov. 20, 2015—U.S. Non-Final Office Action—U.S. Appl. No. 14/611,915.

(56) References Cited

OTHER PUBLICATIONS

Dec. 9, 2013—U.S. Non-Final Office Action—U.S. Appl. No. 13/961,000.
Apr. 6, 2016—U.S. Final Office Action—U.S. Appl. No. 13/446,146.
Sep. 10, 2019—U.S. Notice of Allowance—U.S. Appl. No. 16/028,215.
May 30, 2019 U.S. Notice of Allowance and Fees Due—U.S. Appl. No. 15/819,066.
Jun. 5, 2019 U.S. Notice of Allowance and Fees Due—U.S. Appl. No. 15/482,954.
May 9, 2019—(CA) Office Action—Application No. 2,975,450.
Sep. 9, 2016—U.S. Non-Final Office Action—U.S. Appl. No. 14/989,390.
Sep. 15, 2016—U.S. Non-Final Office Action—U.S. Appl. No. 14/959,402.
Oct. 31, 2016—U.S. Notice of Allowance—U.S. Appl. No. 15/058,371.
Oct. 7, 2016—U.S. Office Action—U.S. Appl. No. 15/135,101.
Dec. 16, 2016—U.S. Non-Final Office—U.S. Appl. No. 14/959,438.
Jan. 20, 2017—U.S. Notice of Allowance—U.S. Appl. No. 14/959,402.
Feb. 17, 2017—U.S. Notice of Allowance—U.S. Appl. No. 13/446,146.
Mar. 3, 2017—U.S. Final Office Action—U.S. Appl. No. 14/989,390.
Mar. 10, 2017—U.S. Notice of Allowance—U.S. Appl. No. 15/135,101.
Apr. 4, 2017—U.S. Notice of Allowance—U.S. Appl. No. 14/959,438.
Sep. 20, 2017—U.S. Notice of Allowance—U.S. Appl. No. 14/989,390.
Nov. 2, 2017—U.S. Non-Final Office Action—U.S. Appl. No. 15/180,416.
Nov. 2, 2017—U.S. Non-Final Office Action—U.S. Appl. No. 15/258,312.
Nov. 16, 2017—U.S. Non-Final Office Action—U.S. Appl. No. 15/593,529.
Mar. 27, 2018—U.S. Notice of Allowance—U.S. Appl. No. 15/593,529.
May 18, 2018 U.S. Non-Final Office Action—U.S. Appl. No. 15/180,416.
May 31, 2018—U.S. Non-Final Office Action—U.S. Appl. No. 15/463,594.
May 31, 2018—U.S. Non-Final Office Action—U.S. Appl. No. 15/598,732.
Jun. 15, 2018—U.S. Notice of Allowance—U.S. Appl. No. 15/258,312.
Jun. 4, 2018—(CA) Office Action—App 2,975,450.
Jun. 25, 2018—U.S. Non-Final Office Action—U.S. Appl. No. 15/482,954.
Jun. 22, 2018—(EP) Supplementary European Search Report—EP16746952.
Anonymous: "On-Board Diagnostics—Wikipedia", Jan. 29, 2015, XP055478209.
Sep. 6, 2018—U.S. Non-Final Office Action—U.S. Appl. No. 15/398,256.
Nov. 13, 2018—U.S. Non-Final Office Action—U.S. Appl. No. 15/819,066.
Jan. 31, 2019—U.S. Final Office Action—U.S. Appl. No. 15/482,954.
Mar. 15, 2019—U.S. Notice of Allowance—U.S. Appl. No. 15/398,256.
May 8, 2019—(EP) Examination Report—EP16746952.7.

* cited by examiner

ROADSIDE ASSISTANCE

CROSS-REFERENCE TO RELATED APPLICATION

This application is a division of U.S. patent application Ser. No. 15/398,256 entitled "Roadside Assistance" filed on Jan. 14, 2017, which is a continuation of U.S. patent application Ser. No. 15/058,371 entitled "Roadside Assistance", now issued as U.S. Pat. No. 9,584,967, which is a continuation of U.S. patent application Ser. No. 13/446,192, entitled "Roadside Assistance" now issued as U.S. Pat. No. 9,384,491, which claims priority to U.S. Provisional Application Ser. No. 61/475,316 entitled "Roadside Assistance" filed on Apr. 14, 2011, which is hereby incorporated by reference in its entirety. Also, U.S. patent application Ser. No. 13/446,192, entitled "Roadside Assistance" now issued as U.S. Pat. No. 9,384,491 is a continuation-in-part of U.S. patent application Ser. No. 12/859,627, now issued as U.S. Pat. No. 9,070,243, and claims priority to both U.S. Provisional Application Ser. No. 61/235,217, entitled "Assistance on the Go," filed Aug. 19, 2009, and U.S. Provisional Application Ser. No. 61/255,349 entitled "Assistance on the Go," filed Oct. 27, 2009, all applications are herein incorporated by reference in their entirety. Further, U.S. patent Ser. No. 13/446,192, is a continuation-in-part of, which this patent application claims priority to, U.S. patent application Ser. No. 12/859,634, now issued as U.S. Pat. No. 8,645,014, which claims priority to both U.S. Provisional Application Ser. No. 61/235,217, entitled "Assistance on the Go," filed Aug. 19, 2009, and U.S. Provisional Application Ser. No. 61/255,349 entitled "Assistance on the Go," filed Oct. 27, 2009, all applications are herein incorporated by reference in their entirety.

TECHNICAL FIELD

Aspects of the disclosure relate to roadside service and other enhanced services using a mobile device. More specifically, aspects of the disclosure relate to wireless-enabled devices that communicate with a remote server computer to facilitate and enhance roadside services and other services.

BRIEF DESCRIPTION OF THE DRAWINGS

Aspects of the disclosure may take physical form in certain parts and steps, embodiments of which will be described in detail in the following description and illustrated in the accompanying drawings that form a part hereof, wherein.

It will be apparent to one skilled in the art after review of the entirety disclosed that the steps illustrated in the figures listed above may be performed in other than the recited order, and that one or more steps illustrated in these figures may be optional.

SUMMARY OF INVENTION

In one embodiment in accordance with aspects of the disclosure, a mobile computerized apparatus configured to provide membership status in a roadside assistance program after occurrence of a roadside event is disclosed. The apparatus executes instructions that cause/allow the apparatus to receive input related to an electronic membership card, retrieve from a data store membership information associated with the vehicle, and dynamically update the electronic membership card for display on the apparatus.

In one embodiment in accordance with aspects of the disclosure, a mobile computerized apparatus for use with a roadside assistance program to assist in identifying a service provider, such as a tow truck, is disclosed. The apparatus transmits relevant information to a remote server. The server in turn provides information about a plurality of service providers available to service the vehicle.

DETAILED DESCRIPTION

Figure 1:
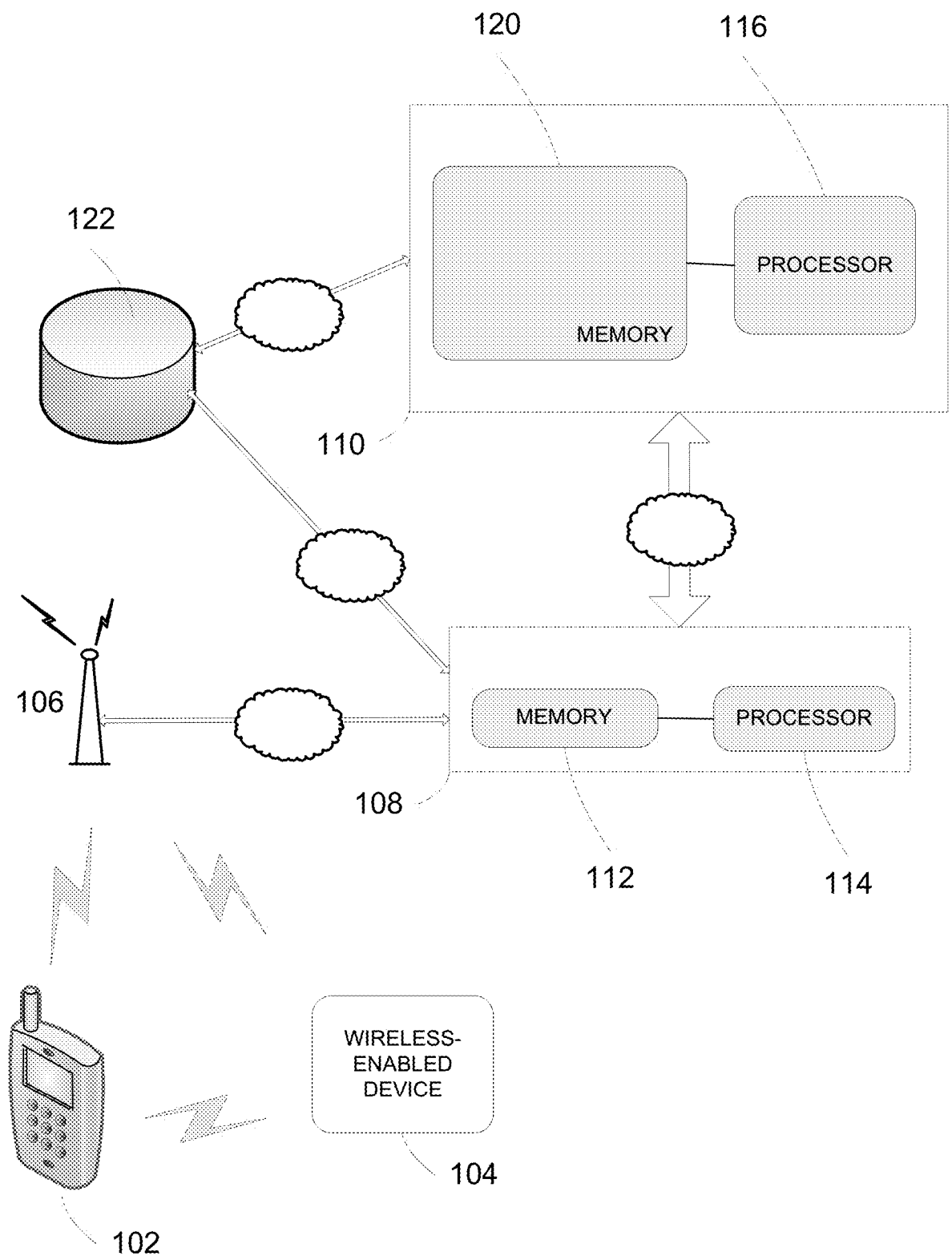
FIG. 1 depicts an illustrative operating environment in accordance with aspects of the disclosure.

FIG. 1 depicts an illustrative operating environment in accordance with aspects of the disclosure. A user of wireless-enabled devices 102, 104 may communicate with a wireless access point 106. The wireless-enabled device 102 may be a mobile telephone with applications and other functionality (e.g., APPLE® iPhone, RESEARCH IN MOTION® Blackberry, HTC® Android-based G1, or other mobile telephone), a handheld device with Wi-Fi connectivity (e.g., APPLE® iTouch), a mobile telephone with an enhanced roadside assistance application installed, or other portable electronic device. The wireless-enabled devices 102, 104 may be configured to communicate with a wireless access point 106 such as a cellular tower operated by a cellular service provider. Alternatively, the wireless access point 106 may be a Wi-Fi (e.g., compatible with IEEE 802.11a/b/g/etc. wireless communication standards) hotspot where the wireless-enabled device 102, 104 may obtain access to the Internet (e.g., to communicate using online chat applications or voice-over-IP applications). One skilled in the art will appreciate that other techniques may be used to allow devices 102, 104 access over a wide area network (WAN).

The data communicated from the user devices 102, 104 may be transmitted to a server 108. The server 108 (e.g., a high-performance Intel® computer) may include a memory 112 storing computer-readable instructions and a processor 114 for executing the computer-readable instructions. The data communicated to the server 108 from the user device 102, 104 may be transmitted over the WAN through wireless access point 106. Meanwhile, another server 110 may be comprised of a memory 120 storing computer-readable instructions and a processor 116 for executing the computer-readable instructions in accordance with aspects of the disclosure. The memories 112, 120 may also store computer data files that hold information that may be useful to applications running on the user's mobile device 102, 104 or the servers 108, 110. For example, the computer data files may include user login/profile information, insurance policy (or motor club) information, service provider list and related information, and/or other information. The data collected and stored in the data files may be used to support one or more of the numerous features disclosed throughout this disclosure.

One skilled in the art will appreciate that the server (e.g., servers 110 and 108) is not limited to a single machine or device. The server may be embodied as a web server or Internet-accessible server. Furthermore, the term server refers to any system of computers and/or devices (e.g., firewalls, routers, caching systems, proxy servers, etc. or combination thereof) that may be used to provide access to services and features available for use. As such, different reference to the server performing particular steps does not require that the same machine/device perform all the steps.

Servers (108 and 110), data store 122, and wireless access point 106 may communicate over a wired and/or wireless connection. In some instances, a private, secure connection may be established between one or more of these components. For example, server 108 and server 110 may communicate over a network cloud representing the Internet. Alternatively, server 108 and data store 122 may communicate over a secure WAN or a dedicated T1 (or other telecommunications) line. Furthermore, wireless devices 102, 104 may include a processor, memory, display screen (e.g., touchscreen), keypad, sensors (e.g., motion, light, etc.), camera, global positioning system (GPS) chip, audio output/input devices, and other electronic components configured for use in mobile phones, PDAs, and mini-laptops.

In another example, one or more servers 108, 110 may include a processor, RAM, ROM, communications module, and/or memory storing an operating system, applications, and/or data. The server may have a processor for controlling overall operation of the server and its associated components, including random access memory, read-only memory, communications module, and memory. Such a server may include a variety of computer readable media. Computer readable media may be any available media, both tangible and intangible, that may be accessed by the server and include both volatile and nonvolatile media, and removable and non-removable media. By way of example, and not limitation, computer readable media may comprise a combination of computer storage media and communication media. Computer storage media include volatile and nonvolatile, removable and non-removable media implemented in any method or technology for storage of information such as computer readable instructions, object code, data structures, program modules or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the server.

The aforementioned server may include one or more applications representing the application data stored in RAM memory while the server is on and corresponding software applications (e.g., software tasks) are running on the server. The aforementioned communications module may include a microphone, keypad, touch screen, and/or stylus through which an (optional) user of the server may provide input, and may also include one or more of a speaker for providing audio output and a video display device for providing textual, audio/visual and/or graphical output. Software may be stored within the memory and/or storage to provide instructions to the processor for enabling the server to perform various functions. For example, memory may store software used by the server, such as an operating system, application programs, and/or an associated database. Alternatively, some or all of the computer executable instructions for the server may be embodied in hardware or firmware. Moreover, a database (or data store) 122 may provide centralized storage of data.

Such a server may operate in a networked environment supporting connections to one or more remote computing devices. The remote computing devices may be personal computing devices or servers that include many or all of the elements described above relative to the server. Remote computing devices may be a mobile device communicating over wireless carrier channel. The network connections depicted in the figures may include a local area network (LAN) and/or a wide area network (WAN), but may also include other networks. When used in a LAN networking environment, the server may be connected to the LAN through a network interface or adapter in the communications module. When used in a WAN networking environment, the server may include a modem in the communications module or other means for establishing communications over the WAN, such as the Internet. It will be appreciated that the network connections shown and described are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various commonly known web browsers can be used to display and manipulate data on web pages.

Figure 2:
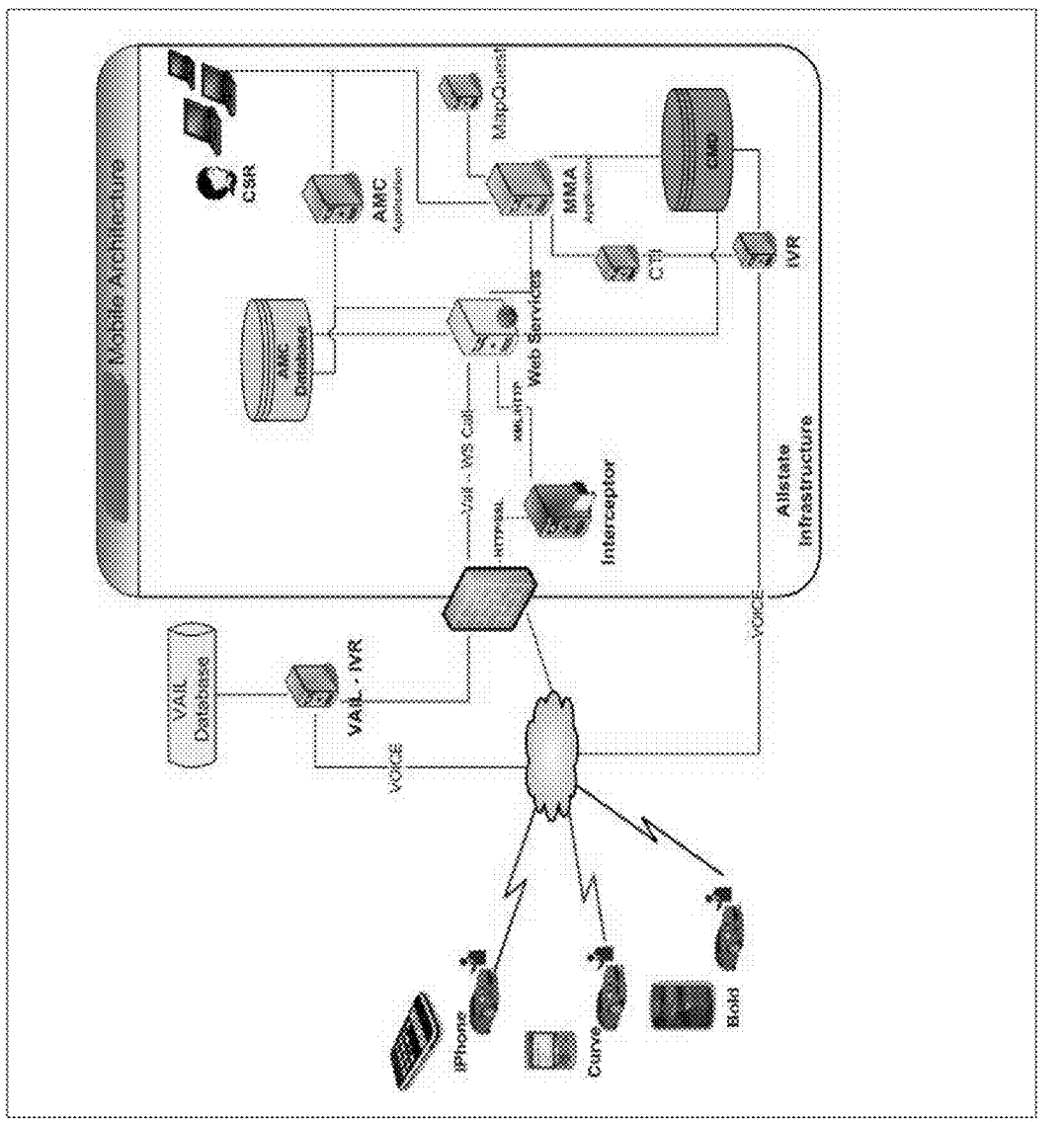
FIG. 2 illustrates an exemplary operating environment in accordance with aspects of the disclosure.

Referring to FIG. 2, numerous mobile wireless-enabled devices are illustrated connecting to mobile architecture 200 over a wireless network. The mobile architecture includes wired and/or wireless connections with servers, data store/database, and a wireless access point. An interactive voice response (IVR) system may also be included to facilitate services not using a cellular data plan. Numerous different application servers and data stores may be included in the mobile architecture, including, but not limited to, a database, application server, map server, software application for use at a call center or for a customer service platform), CTI (i.e., computer telephony integration—which presents voice and data within a customer service platform), data store in which customer and supporting data tables may be housed), IVR (interactive voice response) server, web services application server, interceptor, and firewall. The mobile wireless-enabled devices in FIG. 2 may have application software installed in accordance with various aspects of the disclosure. The application software may permit the mobile device to communicate with a remote web services application server through the firewall. In an alternative embodiment, the mobile device may have a thin-client installed that provides an interface for the mobile device to execute application software on a remote server. One skilled in the art will appreciate the numerous advantages and disadvantages related to the thin-client and thick-client design choices contemplated by the various embodiments of the disclosure. Moreover, in some embodiments, the mobile device may receive notifications of software updates (e.g., new versions) of the application and can receive automatic (or manually authorized) download and installation of the updates.

Flat Tire.

In one example in accordance with aspects of the disclosure, John Doe's (i.e., a user) vehicle has a flat tire. John has previously installed a roadside assistance application in accordance with various aspects of the disclosure on his APPLE® iPhone, and he has registered his vehicle with the application. After launching the roadside assistance application, the registered application attempts to assess whether John is in a safe location. If John presses the "911" icon, the application will automatically dial the emergency line to locate emergency assistance for John. However, in this case, John is at the parking garage near his office building, and he presses the "Yes" icon.

Figure 5:
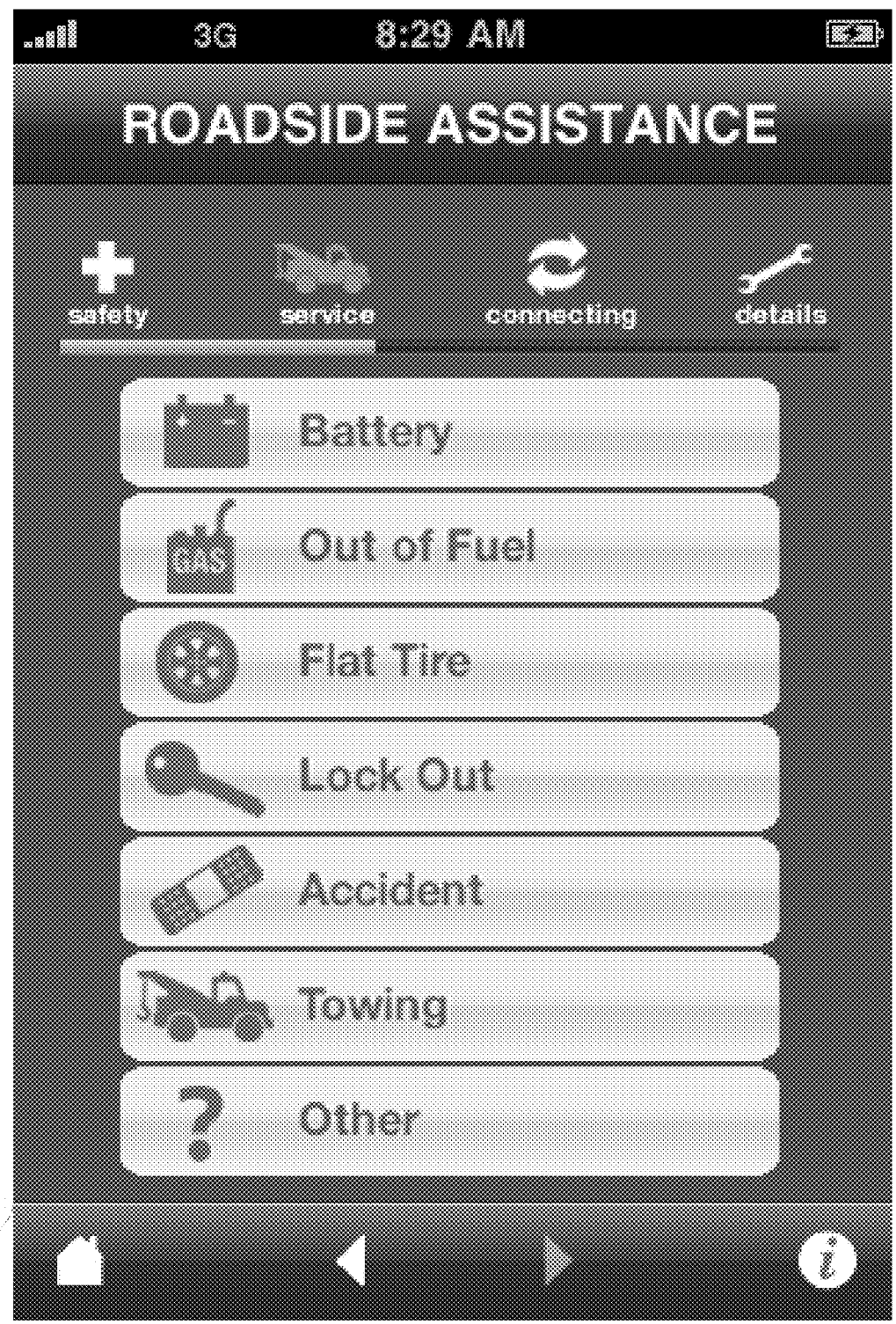

Next the application, in this example, requests information about John's service needs (see FIG. 5). The application provides a list of services 500 to John in a "Service Type" selection box. Some examples of service types include, but are not limited to, locked out (i.e., locked out of one's vehicle), flat tire/tire needs air/tire change, dead battery/battery service/battery replacement, jump start, out of gas/incorrect fuel/fluids, towing, vehicular accident/vehicle fire, mechanical failure/brakes/transmission/engine, lock out/locked out/lost keys/damage keys/keys locked in car, locksmith, winch/stuck, won't start, stalled while driving, reunite, dealer service, transfer, recovery, wrecker, and other (i.e., the service type when none of the listed services are appropriate). In addition, in those cases where the mobile device 102, 104 provides functionality to retrieve and display a user's phone number, the application may retrieve and display that information. John, in some embodiments, may be permitted to edit the callback number displayed by the application if he desires.

In an alternative example, the mobile device 102, 104 may automatically receive information about the vehicle directly through communications with the vehicle's onboard diagnostics system (e.g., on-board diagnostics including OBDII interface or other comparable interface with the vehicle's diagnostics system). The mobile device 102 may be equipped with appropriate circuitry and/or firmware/software to communicate via the requisite communication protocols for the ODB II interface. Alternatively, an external accessory (e.g., peripheral device) may be attached to the ODB II interface to translate the ODB II codes/data into a format compatible with the communication protocol of the application on the mobile device 102, 104. For example, the external accessory may be a bluetooth-compliant device that receives the ODB II data and transmits it via bluetooth to the mobile device 102. Alternatively, the external accessory may attach to the pins on a mobile device 102 and receive the data wirelessly transmitted from the ODB II interface. The information received from the vehicle (e.g., through the ODB II interface) may be used to select the appropriate service type without requiring additional user intervention. Moreover, the ODB II codes may be useful to a service provider (e.g., towing company or mechanic) in contemplating the needs of the user in preparation for addressing the user's calamity.

In yet another alternative example, John's vehicle may be equipped with a wireless transmission module (e.g., transceiver circuitry) to transmit diagnostic information to a car dealership that services his vehicle. The car dealership may then transmit the information to John (e.g., via an onboard display on the vehicle's dashboard). In accordance with various aspects of the disclosure, assume John Doe is driving a BMW® brand vehicle equipped with BMWAssist®. John may register on a server 108 to have updates from a third party (e.g., BMW) computer server routed through a server 108 to his mobile device 102 whenever a defect in his vehicle is detected. John Doe can designate computer server 108 to receive notifications on his behalf from the third-party server. As such, the computer server 108, in accordance with various aspects of the disclosure, can process and transmit the notification to John's mobile device 102. For example, the third-party server may receive notification that a flat-tire has occurred on John Doe's vehicle, and may send a notification to John Doe's mobile device 102 indicating the service type required. Consequently, the "Service Type" information may be pre-filled in the application selection screen. Moreover, in such an example, John may or may not need to be physically present at his vehicle. For example, John may have parked his vehicle in an outdoor lot on a cold winter day while at his office, and he may receive a notification (e.g., a push notification available on APPLE® iPhone OS 3.0 and later, SMS message, e-mail, etc.) on his mobile device 102 in the afternoon stating that his battery has gone dead. John may use his mobile device 102, in accordance with the various aspects of the disclosure disclosed herein, to contact a preferred service provider and repair his vehicle, all while within the comfort of his warm office and not physically present at his vehicle.

Furthermore, the ODB II codes (or other types of diagnostic codes) transmitted from the vehicle to the mobile device 102 may be translated to map against the numerous "Service Type" selections available. ODB II codes (and other types of diagnostic codes) may be different for different make and model of cars; therefore, when a user registers with the application and provides information about his/her vehicle, the appropriate mapping for the type of car can be identified and used for translating diagnostic codes. The mapping table may be stored in computer memory at the mobile device 102 or may be maintained in memory 112 at a remote server 108. Likewise, the translation may occur at a processor at the mobile device 102 or at the remote server 108. One skilled in the art will appreciate that there are numerous benefits and drawbacks to each approach.

Next, mobile device 102 transmits data, either directly or indirectly, to the remote server 108. The transmission may occur in response to a user keypress (e.g., the user selecting a phone icon on the mobile device 102 display). Alternatively, the transmission may occur automatically (e.g., in the embodiments where the ODB II codes are automatically retrieved and transmitted). The data transmitted from the mobile device 102 may include, but is not limited to, the "service type" selected, user identification information (e.g., the mobile device 102 phone number, user's login/user-name, etc.), location information (e.g., retrieved from the mobile device 102, manually entered by the user, triangulated from cellular towers by the cellular service provider, etc.), vehicle diagnostic data (e.g., OBD II data/codes), and other useful information.

Next, the server 108 receives the data transmitted from the mobile device 102. The server 108 may use the data to identify one or more service providers (e.g., towing company, taxi company, mechanic, etc.) in the area. In one embodiment, the identification may occur in real-time using an algorithmic selection process that maintains ratings and other metrics about the service providers, and selects one or more provider based on these ratings and metrics. In another embodiment, the provider identified may be based on a company's preferred high-quality relationship with particular service providers.

In one embodiment in accordance with aspects of the disclosure, the server 108 may transmit information about one or more service providers to the mobile device 102 for the user's review and final selection. As such, information such as a service provider's name, contact information, rating, and other metrics (e.g., distance from mobile device's location, cost, etc.) may be displayed on the user's mobile device 102. In an alternative embodiment, the server 108 may communicate directly with a service provider and hire a service provider to service the user. For example, the server 108 may communicate over a network (e.g., the Internet, WAN, etc.) with a service provider's server 110. The server 110 may receive a request for a particular service. The request may include pertinent information about the service required, including the location of the vehicle requiring servicing, the type of service required, the make/model/color of the vehicle requiring servicing, the maximum charge allowed for the service (e.g., pre-contracted towing rates), and other information.

The service provider's server 110 may communicate the information to mobile devices carried by (or installed in the vehicles of) its employees in the field. As such, the employee can accept or reject the new service request. Alternatively, the server 110 may communicate the information to employees located at an office and that are responsible for facilitating new service requests and dispatching service vehicles (e.g., using a wireless dispatch system). Once the service provider accepts the new service request, their server 110 transmits an acceptance message to the server 108. In order to facilitate simultaneous communication to multiple service providers, the server 108 may be required to send a confirmation message to the service provider once acceptance has been received and accepted. At least one benefit of such a system is that multiple service providers may be contacted with a request for a particular service, and then only the "best" service provider willing to accept the service request may be confirmed for the job. In one embodiment in accordance with various aspects of the disclosure, the service providers may include a price or quote (or other information, such as estimated time of arrival at the user's vehicle) in its acceptance message. As such, service providers may compete (e.g., in an auction-like system) for new servicing jobs. Alternatively, the "best" service provider may simply be the first to reply with an acceptance message. In some embodiments, the server 108 may also transmit a cancellation message to the other service providers (i.e., everyone except the one receiving a confirmation message) once a new service request has been filled so that the other service providers are updated about the current status of filled new service requests. Alternatively, new service requests may automatically expire after a predetermined time period. As such, a cancellation message may not be necessary.

Figure 6:
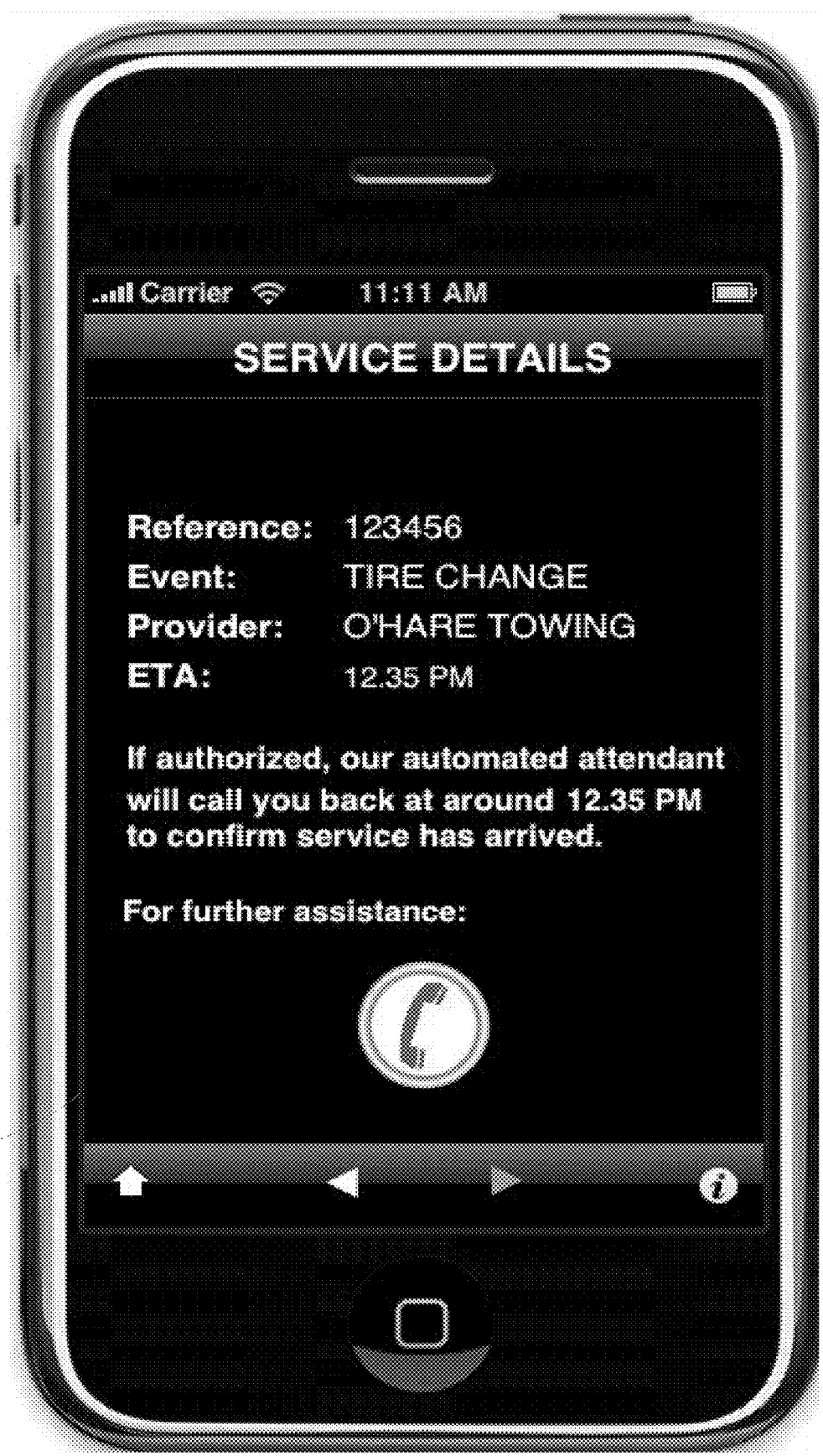

The server 108 may transmit to the mobile device 102 information about the service provider that will be servicing the user's vehicle. The information may include, but is not limited to the name of the service provider, the estimated time of arrival (ETA), the phone number for the service provider (or the mobile phone number of the particular service vehicle servicing the user's vehicle), and/or other useful information. For example, FIG. 6 illustrates an exemplary "service details" screen 600. In some embodiments, the user is conveniently provided with the option of providing feedback while he/she waits for a service provider to arrive. In some embodiments, the mobile device 102 may receive regular (e.g., every 5 minutes, real-time, or on another regular or periodic basis) updates from the server 108 with the approximate location of the service vehicle that will be servicing the user's vehicle. The approximate location may be displayed on a map or may be provided as an approximate distance from the user's vehicle. Moreover, the approximate time until arrival may be displayed and updated on a regular or periodic basis.

In an alternative embodiment, server 108 may provide the mobile device 102 with information about service providers. The user may contact the service providers directly (e.g., by calling their office) to arrange for a service provider. At least one advantage of such a system over simply looking up service providers in a telephone directory is that the server 108 may be able to provide an enhanced list of service providers to the mobile device 102. For example, the list may include one or more service providers that are competent in the particular type of service required of the user's vehicle. As such, the user need not be concerned with whether a particular service provider offers the particular service required of the user's vehicle.

In addition, the server 108 may transmit relevant information to the user's insurance company, emergency contacts, police, fire department, taxi company, and/or others. For example, information necessary for starting a claim may be submitted to the insurance company so the user's process for submitting the claim is already partially completed. In some embodiments, the user may retain full control over whether the insurance company is notified of the user's vehicle situation.

Moreover, a user's parents, spouse, coworkers, etc. may be contacted to alert them about the user's vehicle situation. For example, in one embodiment, the server 108 may receive notification from the user's mobile device 102, and then reference the user's preferences. A copy of the user's preferences may be saved in memory, e.g., as a data file, at the server 108. The preferences may indicate which additional people or organizations to contact and what information to provide to those people. In another embodiment, the application may enable the user to save his/her emergency contact's information on the mobile device 102. For example, the user may enter his insurance agent's information, personal contact information, and emergency contact information. Alternatively, the screen may permit entry of other relevant information about each contact (e.g., email address, SMS number, alternate phone numbers, etc.) As such, the user may conveniently access his contacts through the application's menu.

In one embodiment, the server 108 may automatically send a text message (e.g., SMS, etc.) to the user's parent's phone number (or other people's phone numbers) with a predetermined message. The server 108 may alternatively send an e-mail message to the desired person/organization's email address. In some embodiments, the desired person may have an application installed on his/her mobile device 102 that receives a push notification initiated by server 108. The push notification may include a textual message and/or other appropriate information (e.g., the location of the vehicle/user, the condition of the vehicle, whether anyone is injured, etc.) Alternatively, a customer service representative may be alerted by server 108 to manually call the desired person/organization and provide an appropriate message.

In another embodiment in accordance with aspects of the disclosure, the user may be provided with a guided experience when requesting roadside assistance. The guided experience may be implemented using a series of icons along the top of the screen on the user's mobile device 102. One skilled in the art will appreciate that the guided experience may be provided through different configurations of the icons; for example, the icons may be placed vertically along a side of the screen, or they may be configured in a circular or other pattern around the screen. The series of icons may tell the user where he/she in the process of obtaining roadside assistance.

Figure 3:
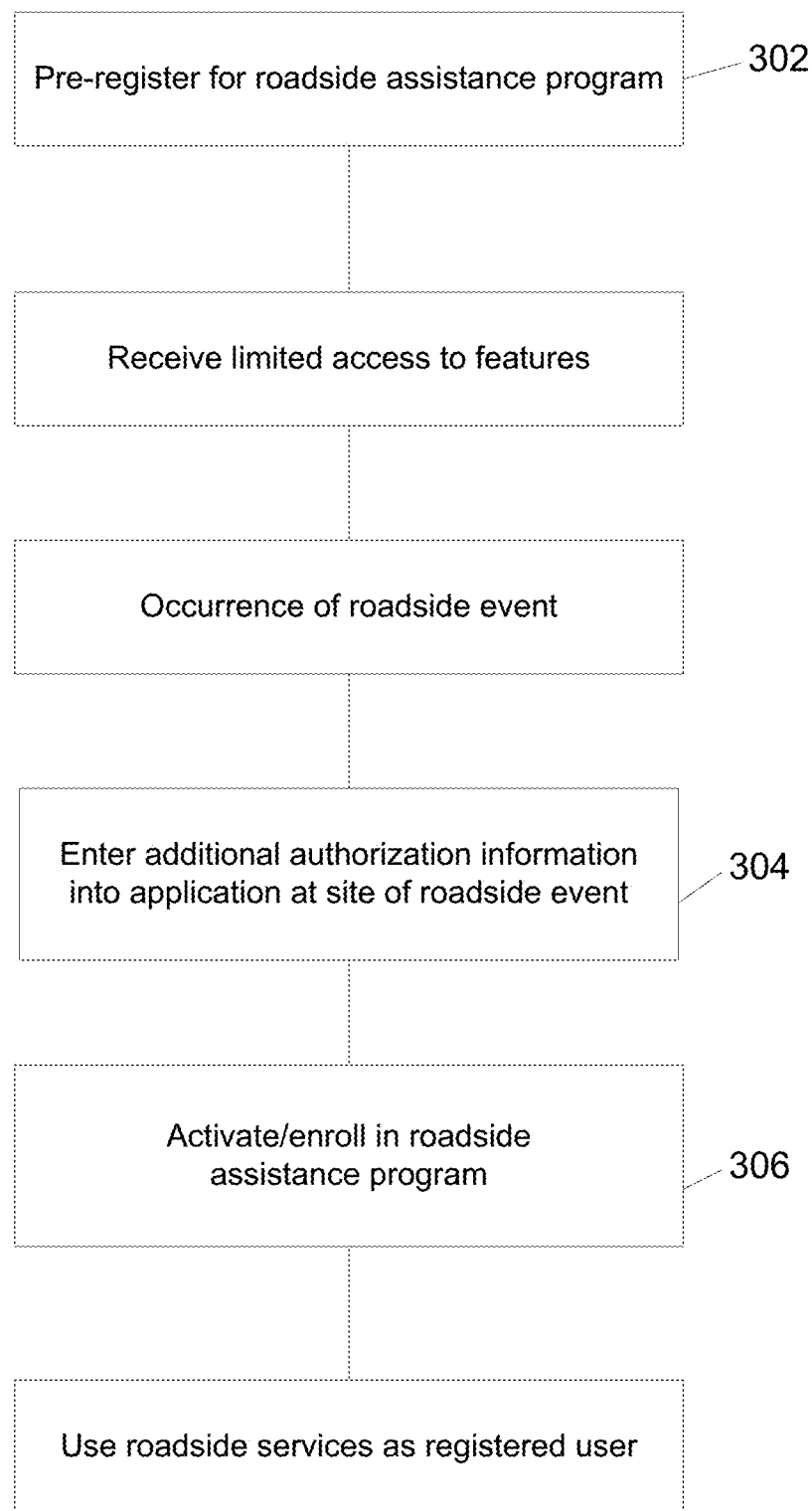
FIG. 3 is a flowchart illustrating the pre-registration process in accordance with aspects oft the association.

In some embodiments in accordance with aspects of the disclosure, the application may verify that the user is in a safe location. An option for calling "911" may be provided should the user require immediate emergency assistance. Next, as depicted in FIG. 3, the application may request information about the type of service the user requires. As discussed in detail above, there are numerous service types 300 that may be available for the user to select. Moreover, as already discussed herein, in some embodiments, the user's vehicle may be equipped with appropriate technology to communicate directly with the mobile device to provide/recommend the service type information. Next, the application may direct the user to call a roadside assistance customer service representative to identify and secure the appropriate roadside service provider for the user. The application on the mobile device 102 may transmit the appropriate information (e.g., member number, member's zip code, service type requested, and/or user's current location) to the customer service center. As such, the representative may already have information about the user and/or user's vehicle on-screen when the conversation begins. Additional information about aspects of this feature is disclosed below, including the use of a caller ID feature to automatically match the user with his/her information.

Once the service provider arrives to provide the user's vehicle with roadside assistance, the user may use his/her mobile device 102 to authorize payment to the service provider. For example, the mobile device 102 may display an icon to permit the user to indicate that service has been satisfactorily provided and completed. Upon receipt of a corresponding message at the server 108 from the mobile device 102, the server 108 may authorize release of funds to the service provider. For example, the server 108 may authorize a bank to perform an ACH transaction of funds directly into the service provider's bank account. In one example, the funds are sourced from the user's bank account; while in another example, the funds are sourced directly from the account of the company providing the roadside assistance program. Meanwhile, in another example a first person (e.g., a parent) may arrange for a second person (e.g., their child) to authorize release of the parent's funds to the service provider. The server 108 may also notify the service provider's server 110 that payment has been authorized. As such, service provider may receive more prompt payment for its services, while also reducing the need to process claims at the insurance company.

Vehicle Incident.

In yet another example in accordance with various aspects of the disclosure, two user vehicles may be involved in a vehicular crash. In such a scenario, the two users may exchange insurance information and other information (e.g., pictures of the crash site taken with a camera on the mobile device 102) wirelessly using their mobile device 102. For example, an application in accordance with various aspects of the disclosure may enable the users to wirelessly transmit (e.g., using Bluetooth, SMS messaging, e-mail, or other wireless transmission techniques) their information to the other user's mobile device. At least one benefit is that the exchange of information between the parties is much more convenient given the stressful situation of a vehicular crash.

In addition, the user may contact a customer service representative to report the vehicular incident. In accordance with various aspects of the disclosure, the representative may already have information about the user and/or user's vehicle on-screen when initiating conversation. For example, the application on the mobile device 102 may transmit the device's phone number and other information (e.g., accident information, user's location, pictures, or other information) to server 108. As such, the representative's system may use the caller ID feature to appropriately identify the transmitted data as corresponding to the phone number identified on the caller ID. Therefore, information about the user and/or user vehicle may already be displayed on the representative's screen when the call commences. Thus, an enhanced roadside assistance program may be offered to users.

Preventive Measures.

As explained earlier, vehicles with onboard diagnostic equipment (e.g., ODB II port) may be able to retrieve information about operating parameters of the user's vehicle. As such, the diagnostic equipment may be able to assist the user in the maintenance and upkeep of the vehicle; thus, resulting in a safer vehicle and hopefully fewer incidents. The mobile device 102 may receive alert notifications when parameters of the vehicle are outside of normal operating limits or limits set by the user or other entity. For example, if the user's battery is dead or low, the user may receive a notification on the mobile device 102 (or elsewhere designated by the user) about the dead or failing car battery. Likewise, if the vehicle's tire pressure runs low, the mobile device 102 may receive a notification. Along with the notification, the mobile device 102 may be provided with one or more service providers (e.g., towing companies, mechanics shops, or other providers) that can repair the problem.

Referring to FIG. 3, the flowchart illustrates various features of the one or more embodiments of the disclosure. The user may register using the mobile device 102, or may, in some embodiments, register online with a personal computer. Once the user is registered, information about the user (e.g., user profile information) may be stored on the mobile device 102 (or on a remote server 108). That information may be useful in storing and displaying information about the user, including a picture of the user's vehicle, make/model/year of the vehicle, vehicle's insurance policy (or motor club) number (e.g., virtual membership card), and other pertinent information. In some embodiments, the user may only be "pre-registered" 302 (i.e., registered with the application with some basic information (e.g., name, vehicle, phone number, etc.), but may not have a membership in a roadside assistance program); thus, features such as the virtual membership card may be grayed out (i.e., deactivated) on the user's screen. However, in one example, the pre-registered user may provide the application with some basic authentication information (e.g., last four digits of social security number, date of birth, and/or membership number) to authenticate herself, and then need only provide 304 some minimal additional authorization information (e.g., credit card information, vehicle information, driver information, etc.) to activate/register 306 for membership in the roadside assistance program. At least one benefit of pre-registration is that a user can go through the lengthy registration process in advance, and then at the time of a roadside event (e.g., car crash), the user can activate the pre-registration for membership privileges with minimal hassle.

One of ordinary skill in the art will understand that the flowcharts illustrate just some examples of functions/features available in accordance with various aspects of the disclosure, and that other examples of features are available as described throughout the specification and figures. For example, various aspects of the disclosure include a feature for obtaining customer feedback. The feature enables prompt and accurate feedback about the user's experience because, inter alia, the feedback is collected almost immediately after the event of interest, and the questions can be tailored to the specifics of the particular event/user/details.

Regarding user vehicle registration, the user may enter various information to register for enhanced roadside assistance. In some embodiments, the user may enter just the vehicle VIN (vehicle identification number). The server 108 and/or mobile device 102 may store the VIN and retrieve information about the vehicle (e.g., made, model, year, etc.) based off the VIN. In an alternative embodiment, the user may also be required to enter membership information, such as name, zip code, or a member identification number. The membership information may be linked to the user's insurance or motor club profile and mapped as such on server 108. As a result, future communications between the mobile device 102 and the server 108 may be recognized as related to a particular member. Membership may refer to membership in a roadside assistance program, motor club, or other group/organization.

Electronic Membership Card.

Figure 4:
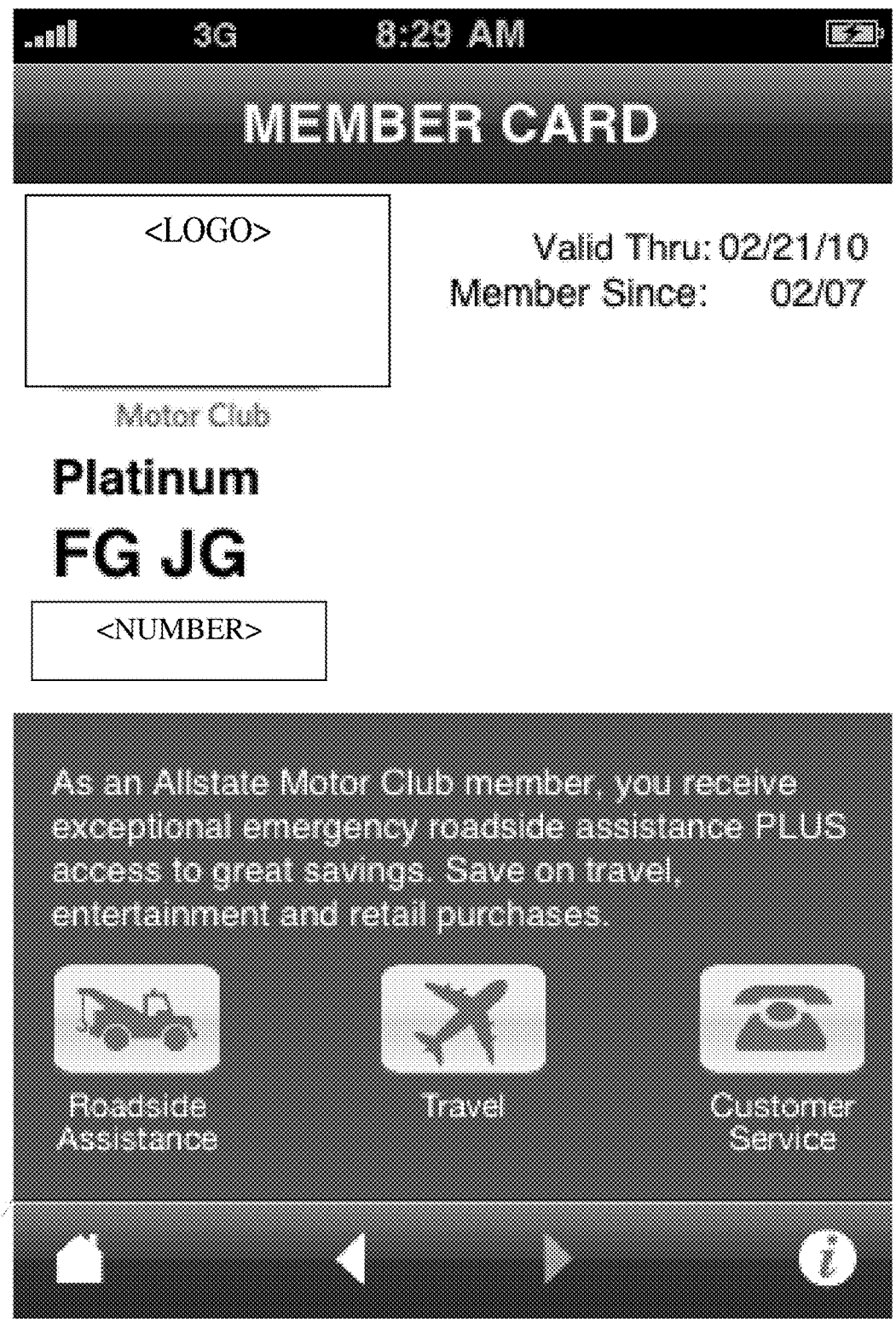
FIGS. 4-6 illustrate exemplary screenshots of an application for roadside assistance in accordance with various aspects of the disclosure.

Membership information may be illustrated in an exemplary virtual membership card screen, as depicted in FIG. 4. The member card screen 400 may illustrate the date through which the user's membership is valid and/or the date since the user has been a member. The user's membership number, membership level (e.g., Platinum), and other information may also be displayed on the membership card screen. At least some of the information displayed on the membership card screen may be locally stored on the mobile device 102. As such, the user need not be connected to a carrier or WiFi in order to retrieve his/her membership information. Alternatively, membership information may be stored on a server 108 and retrieved for display on the screen. At least one benefit of an electronic membership card is that changes to the user's policy and/or other updates may be dynamically pushed to the user's mobile device 102. As such, the user may have instant access to updated policy information and need not necessarily wait for an insurance company to mail him/her an updated membership card. In addition, the membership card screen may include information about services and promotions offered to members. For example, a roadside assistance icon may appear to indicate that roadside assistance on the go is available to the user. In addition, promotions and discounts, for example on travel (e.g., flights, rental cars, hotels, etc.) may be available to members and a corresponding icon or information may appear on the membership card screen accordingly.

Meanwhile, a service provider may also be provided with a registration screen in some embodiments in accordance with aspects of the disclosure. Service provider vehicles may be equipped with wireless-enabled devices (e.g., navigation systems with Internet connectivity) that permit the vehicle operator to react in realtime to service requests. For example, the exact location of the service vehicle can be tracked using this onboard device.

Enhanced Interactive Voice Response (IVR).

In an alternative embodiment, information from the application on the mobile device 102 may be transmitted to a remote server related to an IVR system. For wireless devices 102 with a mobile data plan, the information may be transmitted over a wireless Internet connection. However, in those instances where the mobile device does not have data connectivity, the device may transmit the data to the IVR system using other available means. For example, in one embodiment, the information may be transmitted as a SMS (or comparable text message format) message to the IVR system. As a result, when a user calls into the IVR system, the user may receive an enhanced experience because the user's location and other relevant information may already be available at the IVR system. The IVR may, in some embodiments, still confirm for security reasons the name of the member, zip code of the member, and service requested before transferring the user to a service provider. The disclosed enhanced IVR is beneficial because it alleviates the requirement to have the user listen to endless prompts and respond with touchtone key presses. In some examples, if the user wishes to speak with a customer service representative, he/she may press "0" (or other designated key) to immediately speak with a representative.

Other features in accordance with various aspects of the disclosure are listed below. For example, server 108 may generate a user driving score based on the user's reactions to communications and recommendations from an insurance company or a motor club. The driving score may be used to adjust the user's insurance premiums or membership dues and/or other aspects of the user's insurance policy or motor club membership. In another example, the mobile device 102 may provide the user with information regarding the relative safety of proposed navigation routes as, for example, is described in the provisional applications, which were previously incorporated by reference in their entireties. In yet another example, the mobile device 102 may provide different color-coded zones on a map to indicate the relative safety of various areas. For example, the mobile device 102 may alert the user that a particular intersection is particularly hazardous and has a statistically higher frequency of vehicle incidents. One or more of these features may be provided in accordance with various aspects of the disclosure. In yet another example, the mobile device may provide the user with information regarding the relative safety of drivers or vehicles in the vicinity of the user. This information may be provided through transmission of scores or other data regarding the drivers or vehicles in the vicinity of the user.

In one embodiment in accordance with aspects of the disclosure, a system is described where two servers and a mobile device assist in providing roadside assistance. The mobile device may communicate with a first server and provide various information about the status of a vehicle, the user, and/or other information. The first server may communicate with a second server to electronically request, approve, and monitor a service provider hired to service the vehicle. The first server may provide information and/or regular updates to the mobile device regarding the service provider. The first server may also authorize payment to the service provider once the job is completed. One or more aspects of the aforementioned embodiment are described in greater detail throughout the disclosure.

Figure 7:
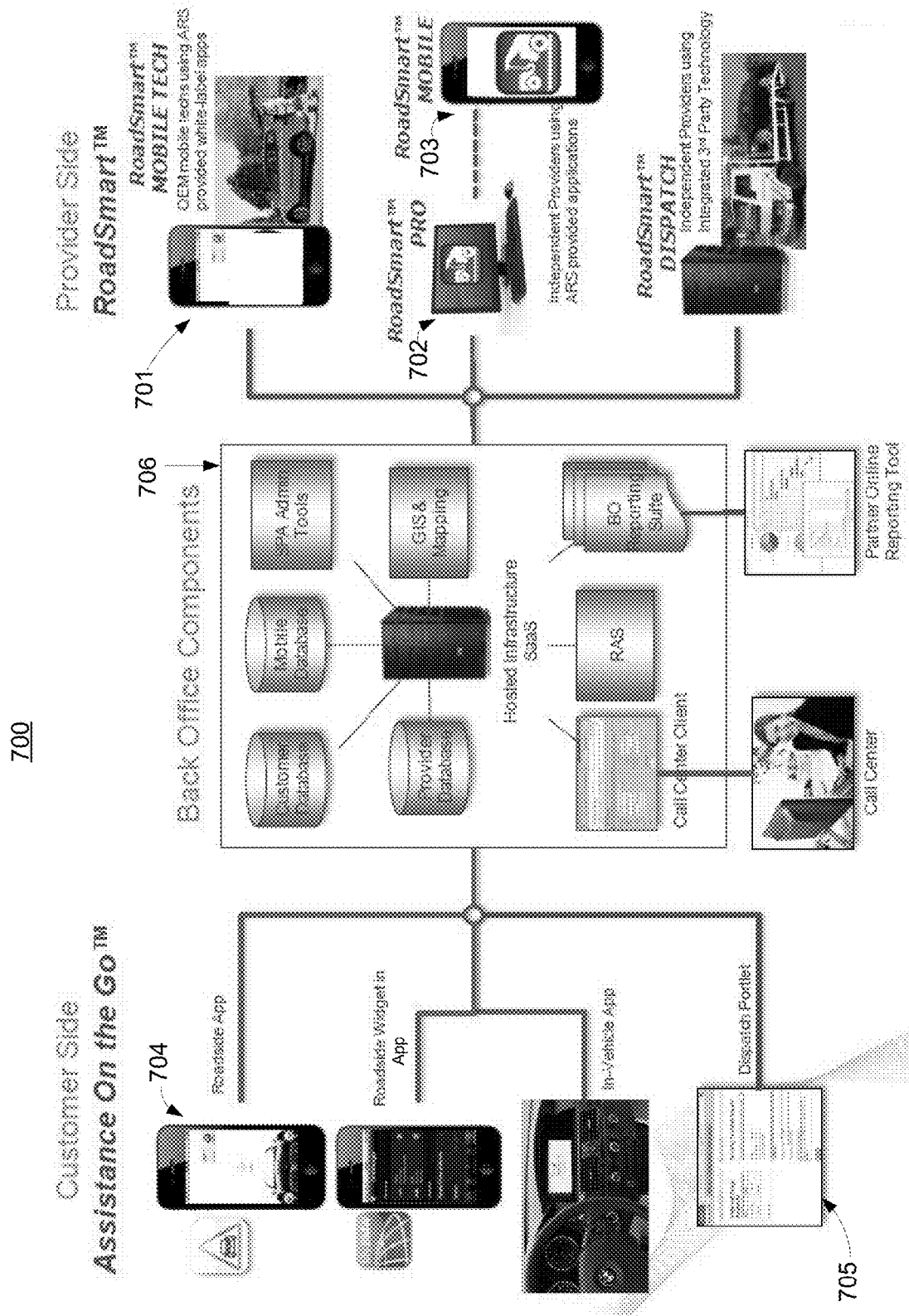
FIG. 7 illustrates a system for roadside service in accordance with various aspects of the disclosure.
Figure 8:
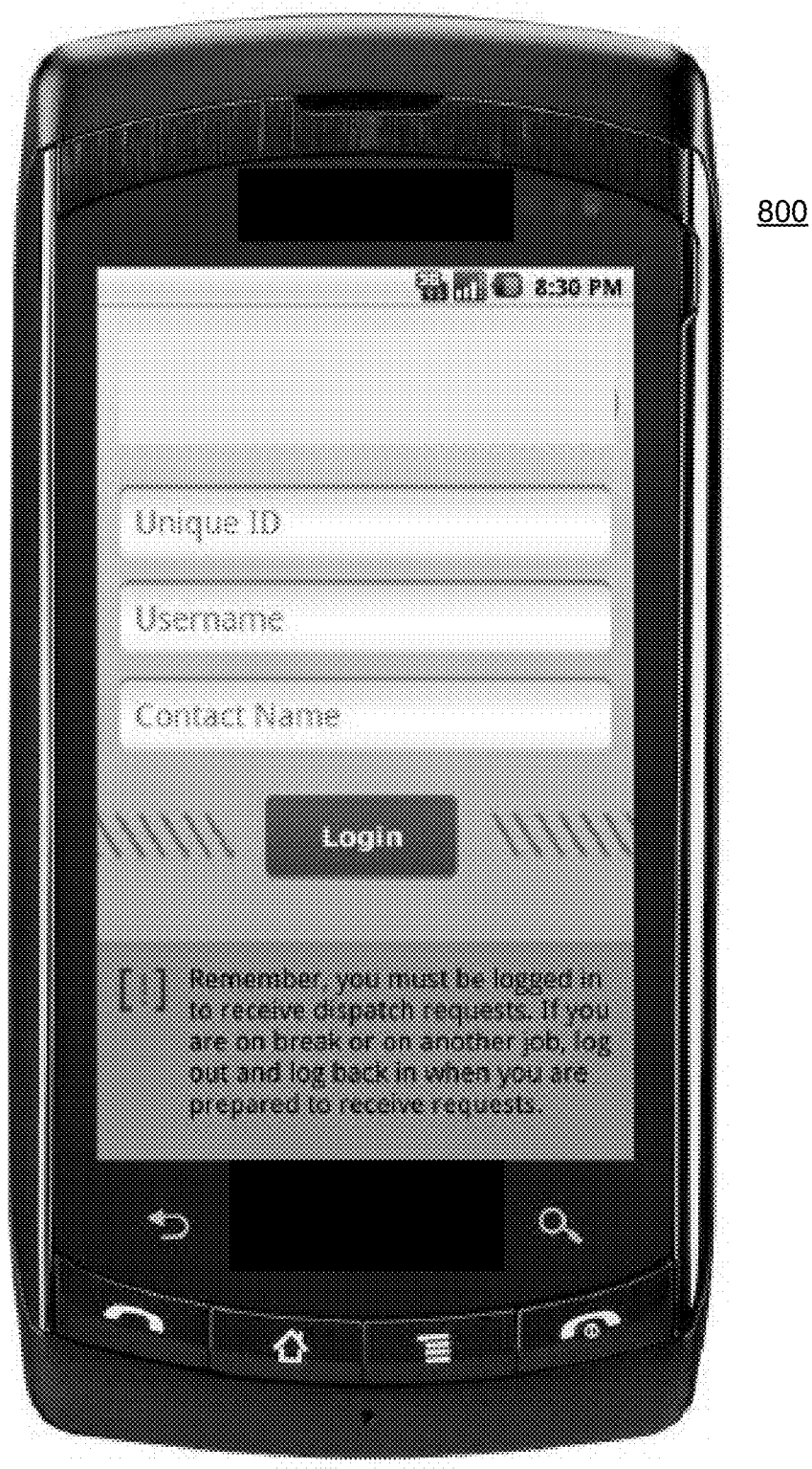
FIGS. 8-11 illustrate exemplary screenshots of an application that provides information to a technician for roadside assistance in accordance with various aspects of the disclosure.

Some features in accordance with various aspects of the disclosure enhance end-to-end roadside experience by leveraging mobile technology and intelligent back office systems. FIG. 7 illustrates system 700 for providing roadside services and will be discussed in further detail. A user application (e.g., executing on terminal 102 as shown in FIG. 1) may leverage GPS and interactive satellite imagery to assist the user to identify the vehicle location of the user. Also a user application may walk the user through the identification of a disablement event and the selection of the service remedy.

Dispatch portlet 705 may be a real-time conduit to an application execution on mobile device 704 as well as a transaction hub for system 700. Dispatch portlet 705 may be a real-time conduit to the dispatch system. For example, dispatch portlet 705 may serve to enable non-centralized or 3' party customer service locations to take customer information and submit dispatch transactions. The portlet 705 may thus become the interface for non-central to 3' party representatives to initiate, confirm, cancel, update and review roadside transactions.

Some features in accordance with various aspects of the disclosure may enhance a user's confidence in advance of the arrival time of a service technician (e.g., a service provider's employee). The time between the request of service and the arrival of the technician may be an important factor of the user's perception of the roadside service. In addition, a picture, name, etc. of the service provider's employee scheduled to service the vehicle may further enhance a user's confidence/comfort in the service provider. Request confirmation and progress updates may be supported to enhance a user's experience. Also, aspects of the disclosure enable the user to call ahead to schedule repair service and/or notify a family member about the disablement event.

Some features, in accordance with various aspects of the disclosure, measure the performance of service providers that may be based on one or more performance criteria. Performance criteria may include on-time arrival at the user's location, the ability to correctly remedy the disablement event, a degree of satisfaction by the user (e.g., the driver of the vehicle), and/or other factors. Consequently, those service providers having the best satisfaction scores may be preferred for future roadside work.

Support for Service Provider and Service Technician.

Figure 9:
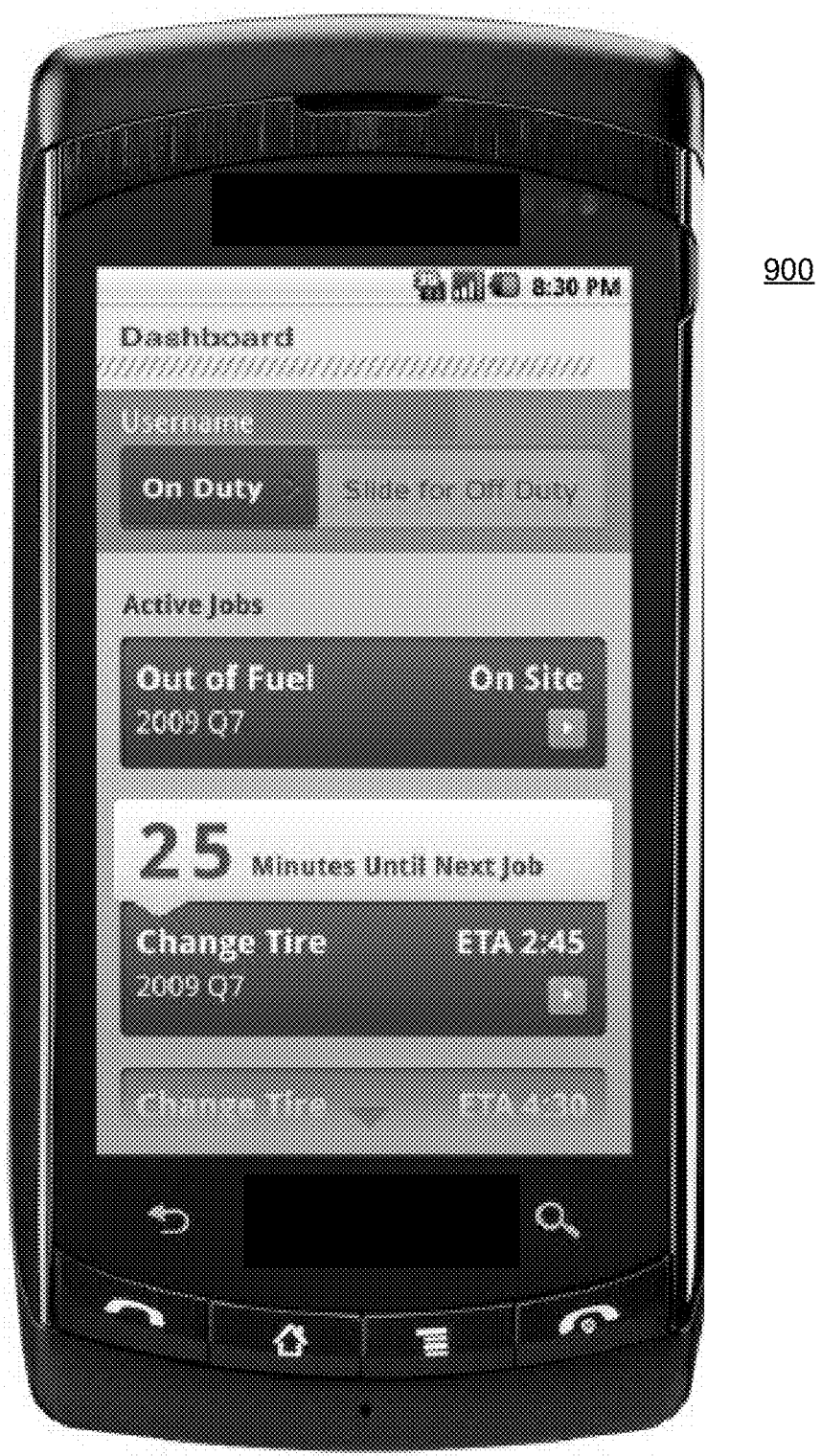
Figure 10:
Figure 11:
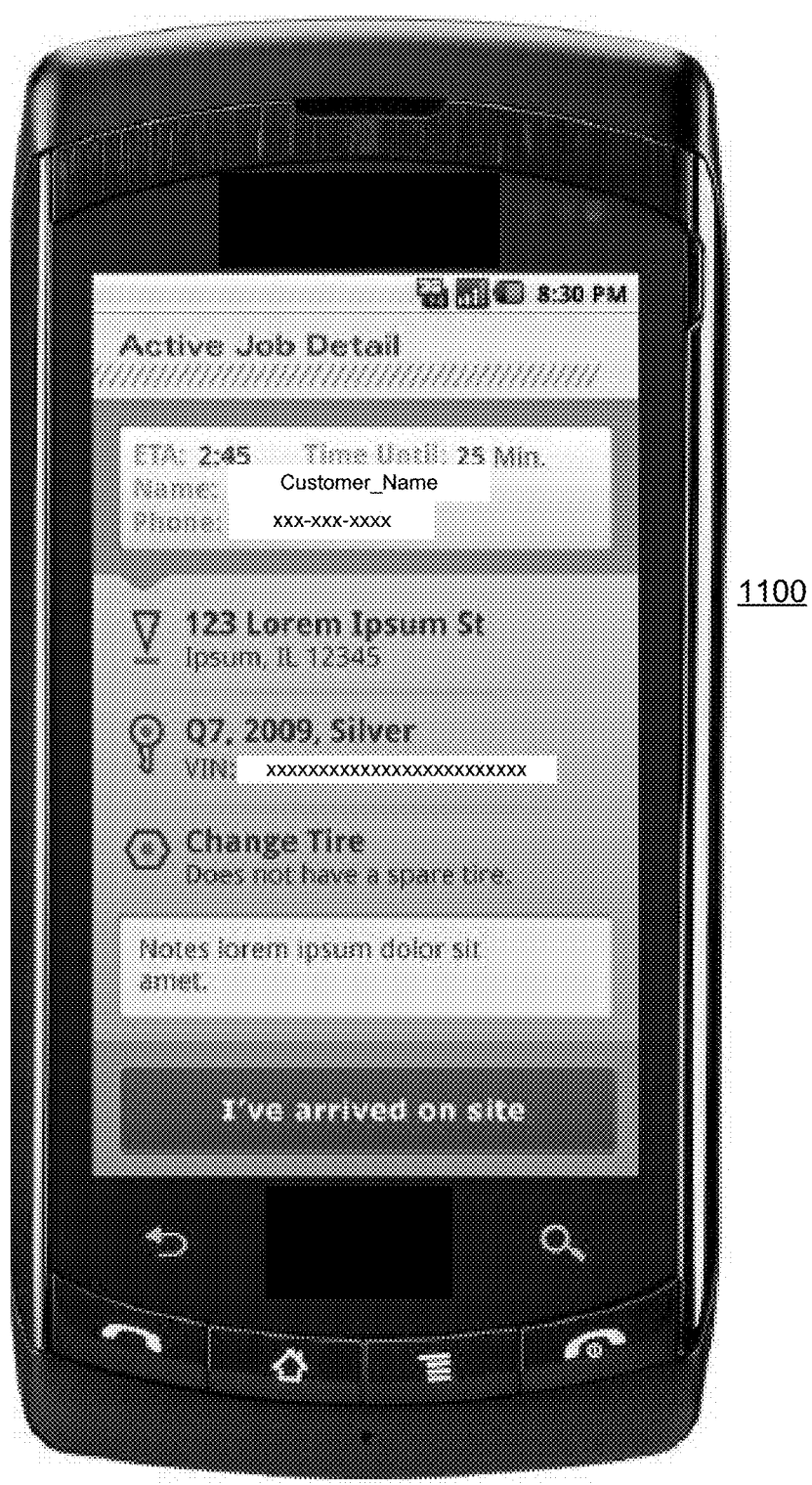

Referring to FIG. 7, aspects of the disclosure provide an application that may be executed on a technician's mobile device 701. FIGS. 8-11 illustrate exemplary screenshots of an application that provides information to a technician for roadside assistance in accordance with various aspects of the disclosure. For example, the technician may be an OEM mobile technician who may activate the application by logging into an application through screen 800. As shown in FIG. 9, screen 900 displays roadside jobs (e.g., any repair service offered by a service provider, including but not limited to jobs along a roadside) that may be available/accessible to the technician. The technician may obtain information about a roadside job by selecting it on screen. As shown in FIG. 10, the technician may obtain information about the selected job and may accept or decline the job through fields 1001 and 1002, respectively. The technician may obtain further information about the job as shown in FIG. 11 by clicking on field 1003. The additional information may include the customer's name, phone number, vehicle identification number, and/or description of the vehicle problem. While not explicitly shown in screen 1100, further information about the disablement event may be provided. For example, a picture of the vehicle provided by the user (as exemplified in FIG. 18) and additional information about the problem (as exemplified in FIG. 19) may be included in screen 1100 or a similar screen.

Referring to FIG. 9, the technician may select a displayed roadside job by clicking on the displayed item. Screen 900 may be organized by computing device 702, where the displayed roadside jobs may be ordered in some fashion. For example, the displayed items may be ordered by time of occurrence, proximity to the technician, priority of the roadside job, or a combination thereof. According to one aspect, the ordering of the displayed roadside jobs may be based on the value of the estimated time of arrival (ETA), e.g., from the shortest ETA to the longest ETA. According to another aspect, the ordering of the displayed roadside jobs may be based on a grade of service. For example, a customer may receive different grades of service (e.g., premium service versus standard service) based on the customer's desired subscription plan.

According to an aspect, a computer device (e.g., incorporated at a technician mobile device 701 or back office component (remote server) 706 as shown in FIG. 7) may order the displayed roadside jobs according to at least one criterion. For example, back office component 706 may retrieve the list of jobs for a roadside technician from a database, order the job entries, and then transmit the ordered list to the technician's wireless device (e.g., a smartphone) 701. As another example, server 706 may pull and send an unordered list to the technician's wireless device 701, which then orders and displays the list on the user's screen.

According to another aspect, a screen showing roadside jobs may display certain jobs in a particular region of the screen. For example, if a user is directly or indirectly (within a predetermined degree of separation) connected to a technician (or the service provider) via Facebook or some other social network, the entry for the user may be displayed at/near the top of the list of available jobs. As another example, if the user and technician has had prior dealings together, the user's job may appear at the top of the particular technician's list of available jobs, where a designated text or graphic symbol may be displayed next to such jobs. As another example, jobs may be automatically prioritized in ascending order of ETA. Consequently, jobs with the nearest ETA appear at the top, while jobs with the longest ETA appear at the bottom. The ETA differential, or the time it takes to get from one job to the next, may then be obvious to the technician.

Again referring to FIG. 9, with some embodiments a customer may be connected with a technician through social networking. For example, the customer may be directly connected to a technician (or the service provider) via Facebook or some other social network. In such a case, the customer may be displayed at or near the top of the list of available roadside jobs. With another example, a customer may not be directly connected to the technician but may be connected by two or more degrees of separation.

Again referring to FIG. 9, the technician may have previously handled a roadside occurrence for the customer. Consequently, the technician may be knowledgeable about the problem so the current roadside job for the customer is displayed at/near the top of the list of roadside jobs or marked (e.g., by a "star" or other graphical symbol) in the list.

Figure 12:
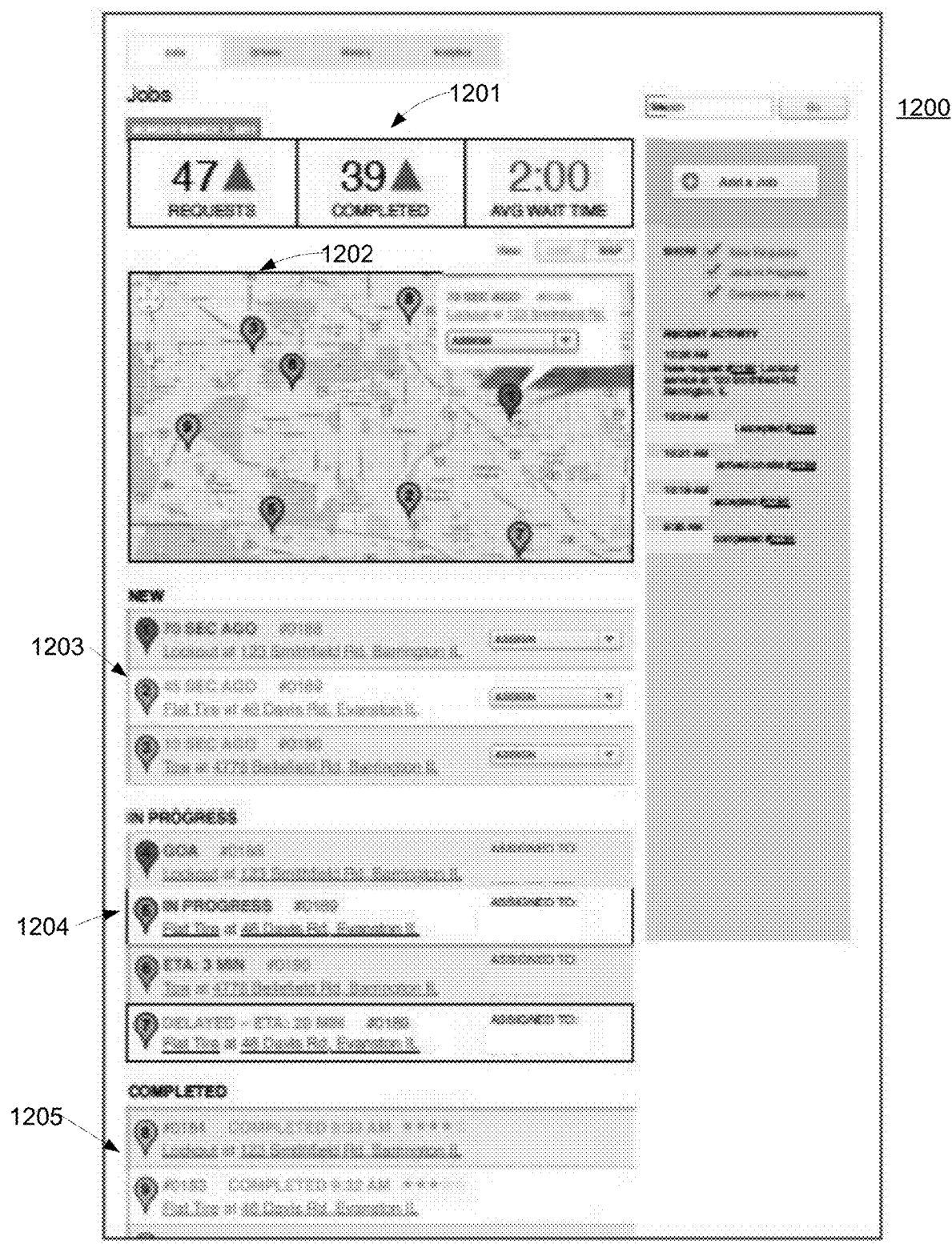
FIGS. 12-13 illustrate exemplary screenshots of an application that supports a service provider's portal for roadside assistance in accordance with various aspects of the disclosure.

With some embodiments, one or more applications may provide roadside information to independent providers. For example, FIG. 12 illustrates an exemplary screenshot of an application that executes on computing device 702 (as shown in FIG. 7) and that supports a service provider's portal for roadside assistance in accordance with various aspects of the disclosure. Screen 1200 may serve as the provider's dispatch tool as well as a provider-facing portal for the roadside assistance service. With some embodiments, screen 1200 and/or additional screens (not explicitly shown) may support dispatching, tracking, history and performance, web claims, training, tow specification, administration, and/or messaging.

Screen 1200 may show a summary of roadside jobs corresponding to the number of requests, completed jobs, and the average wait time in region 1201. Also, a map showing the location of the different jobs may be displayed in region 1202. The statuses of new, in progress, and completed roadside jobs are shown in regions 1203, 1204, and 1205, respectively.

With an aspect of the disclosure, the current status of a roadside job may be displayed on an associated customer's mobile device as the status changes to keep the customer notified. For example, the different states of the status may include:

Open dispatch: The roadside job has not been assigned to a roadside technician.
Assigned dispatch: The roadside job has been assigned to a roadside technician.
En-route: The technician is traveling to the roadside job but is farther than a predetermined distance and/or time threshold.
Approach: The technician is within a predetermined distance and/or time threshold.
On site: The technician is at the customer's location.
Complete: This status is dependent on the type of roadside job.
   For some types of roadside jobs, e.g., tire changes, the job may be completed by the technician arrives at the job location.
   For other types of roadside jobs, e.g., towing a customer's vehicle, the status changes to the on-site status when the technician arrives at the job location. When the customer's vehicle is loaded on the towing truck, the job is complete when after the vehicle arrives at its destination.

Figure 13:
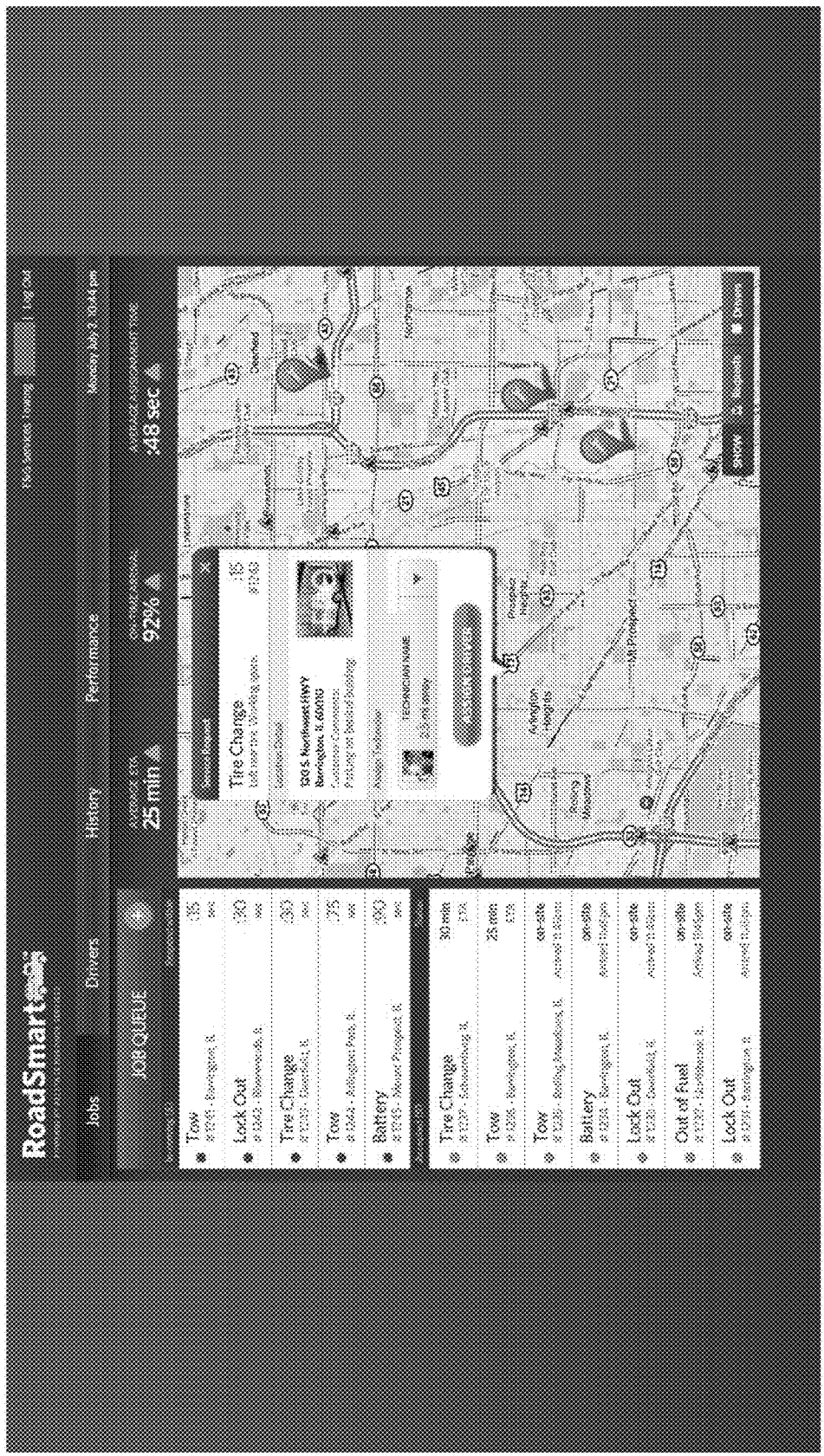

FIG. 13 shows another exemplary screen of an application that executes on computing device 702 (as shown in FIG. 7) and that supports a service provider's portal for roadside assistance in accordance with various aspects of the disclosure.

Figure 14:
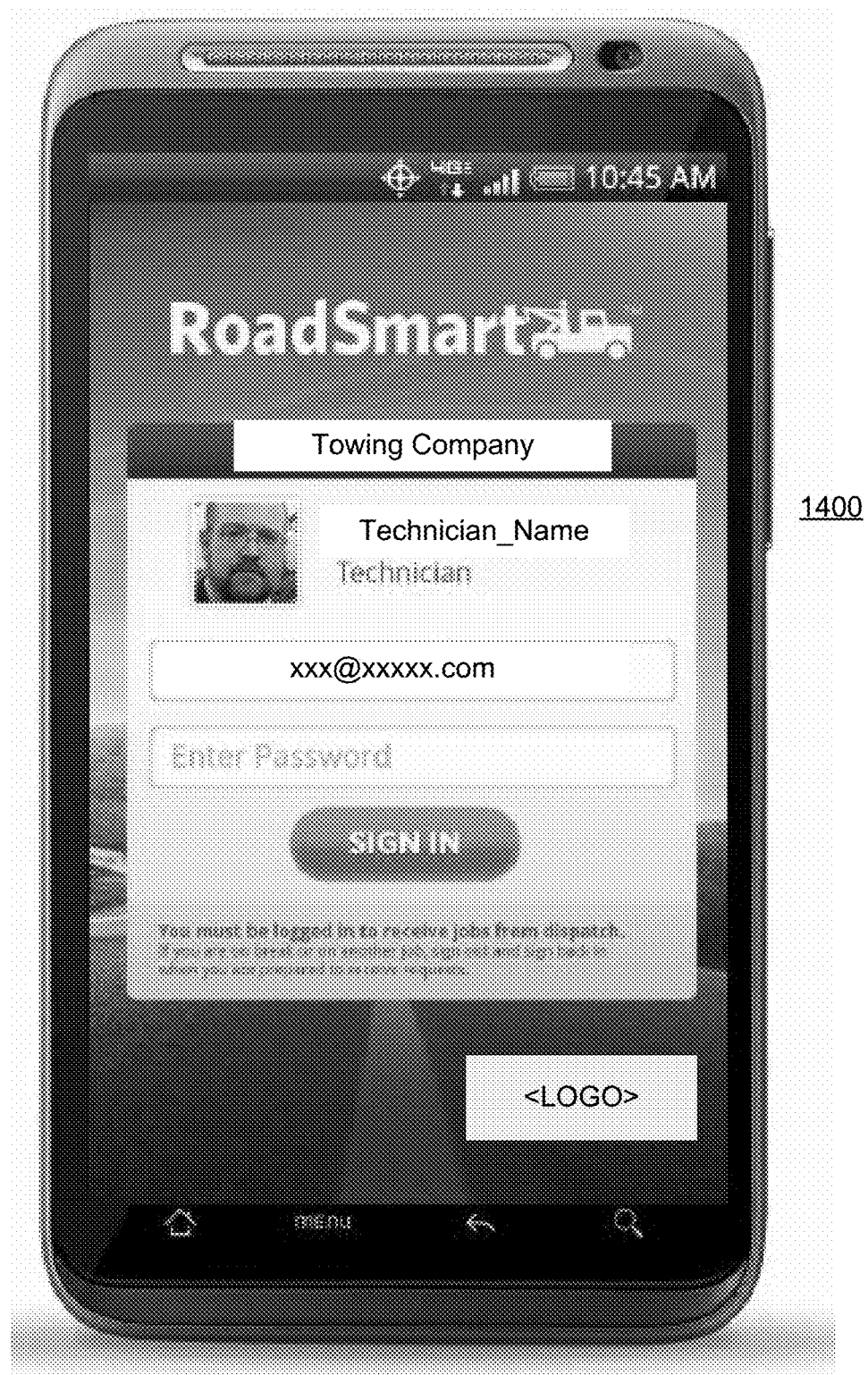
FIGS. 14-16 illustrate exemplary screenshots of an application that provides information to a technician for roadside assistance in accordance with various aspects of the disclosure.
Figure 15:
Figure 16:
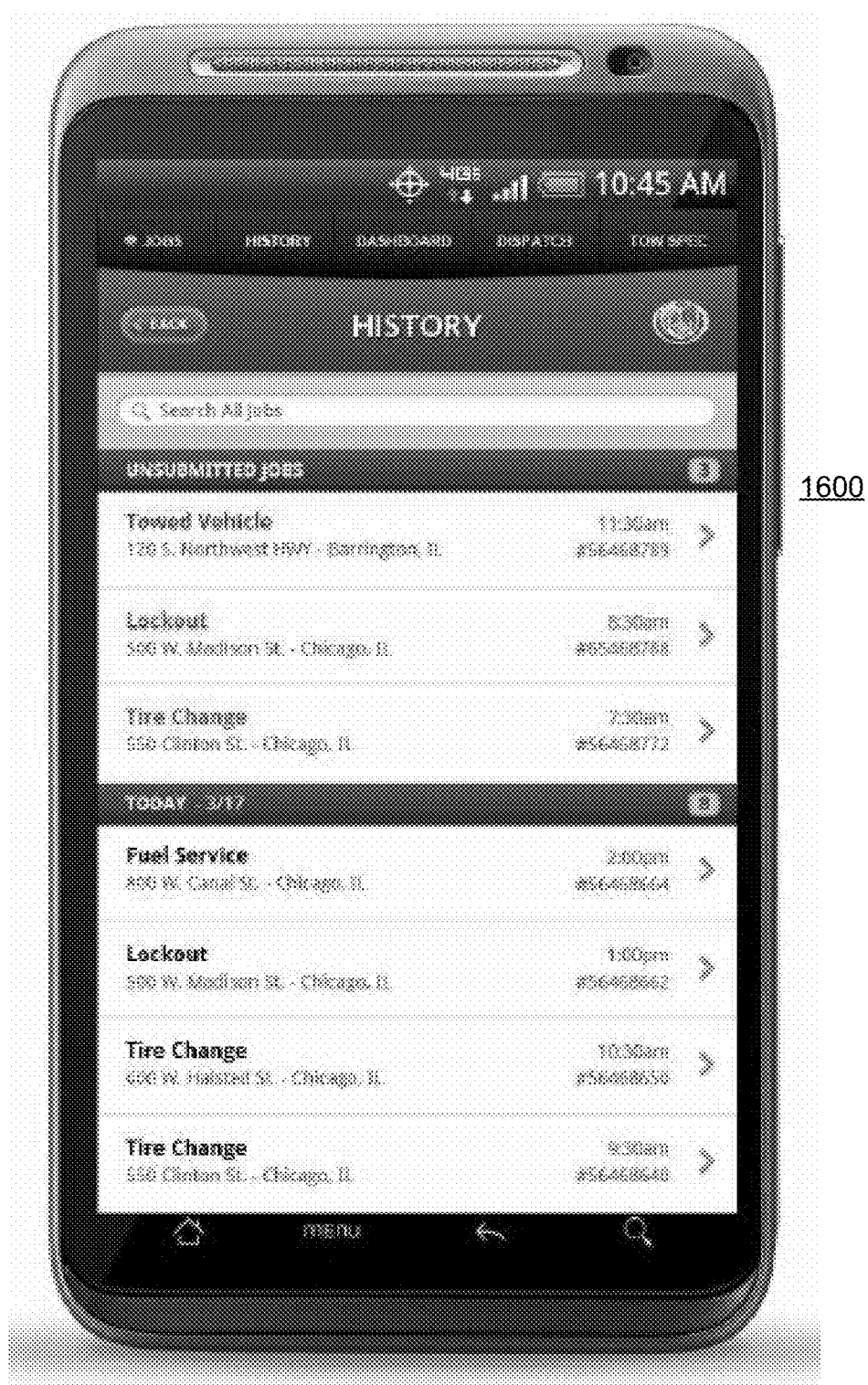

Computing device 702 may interact with one or more computing devices 703 that are associated with one or more technicians. FIGS. 14-16 illustrate exemplary screenshots of an application that provides information to a technician for roadside assistance in accordance with various aspects of the disclosure. The application executing on device 703 may perform in concert with the application executing on device 702 so that the particular technician at device 703 views roadside jobs assigned to that technician or that may be accepted/declined by the technician.

Screen 1500 shows information about a roadside job that the technician may accept or decline after logging into the application through screen 1400. The information may include a description of the disablement event 1501, location and picture of the vehicle 1502, and vehicle description 1503.

With some embodiments, an estimated time of arrival (ETA) may be displayed in region 1504. The ETA may be approximated by an application executing on the technician's computer device (e.g., device 703) based on the distance and traffic conditions between the technician and the roadside job. In addition, the technician may be able to adjust the ETA by clicking on the "−" and "+" buttons within region 1504, for example, when traffic conditions or the technician's status changes.

With some embodiments, a customer may be notified about an adjusted ETA for the customer's associated roadside job. The adjusted ETA may be determined by an application executing on the technician's computer device, as described previously, or may execute on a component of back office 706 as shown in FIG. 7. The adjusted ETA may be determined from the distance and/or traffic conditions between the technician and the customer.

The technician may obtain a history of roadside jobs in screen 1600. The technician may then select one of the unassigned jobs to obtain further details in screen 1600.

Satellite Imagery.

Figure 17:
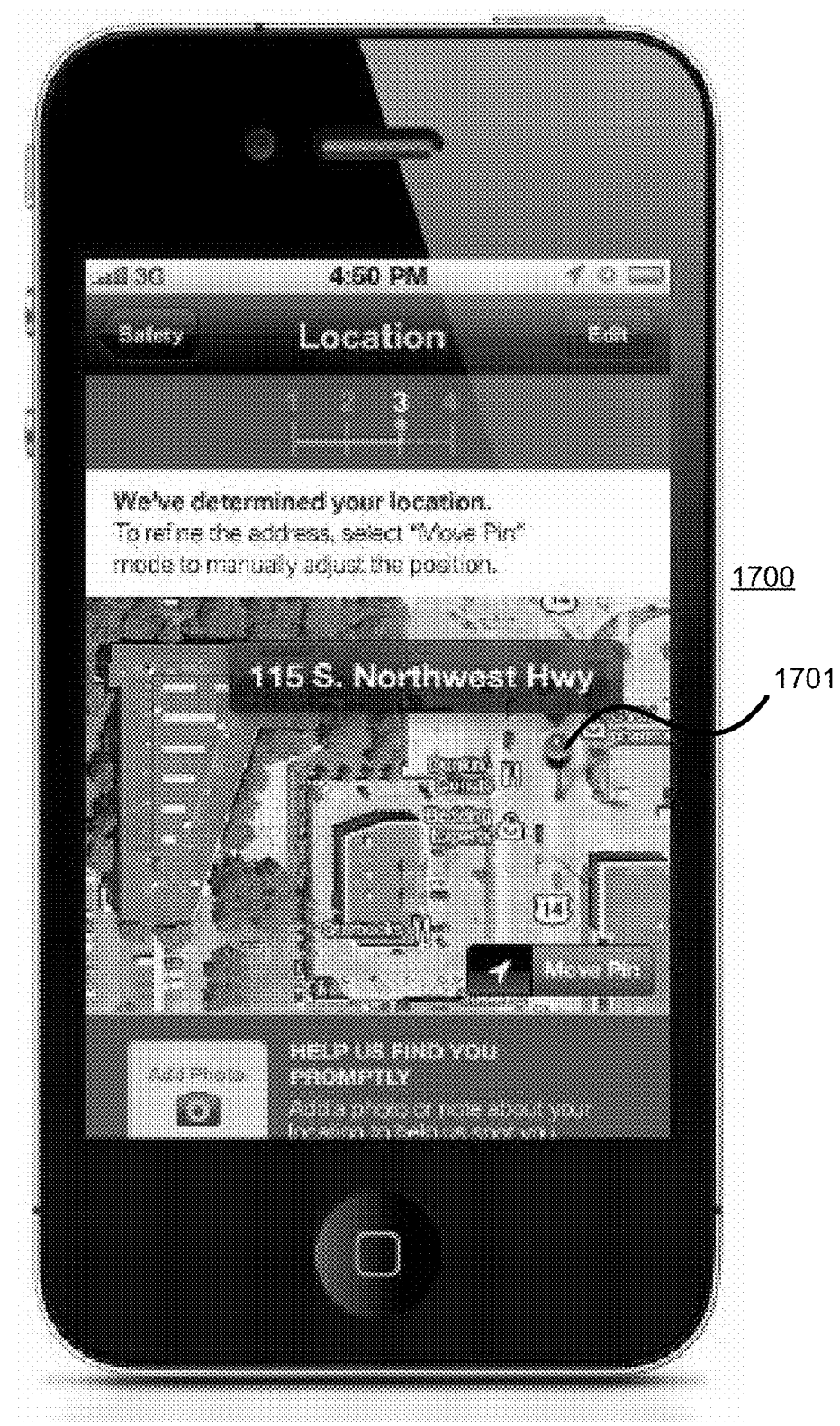
FIGS. 17-18 illustrate exemplary screenshots of an application that provides location information about a user's vehicle using satellite imagery in accordance with various aspects of the disclosure.
Figure 18:
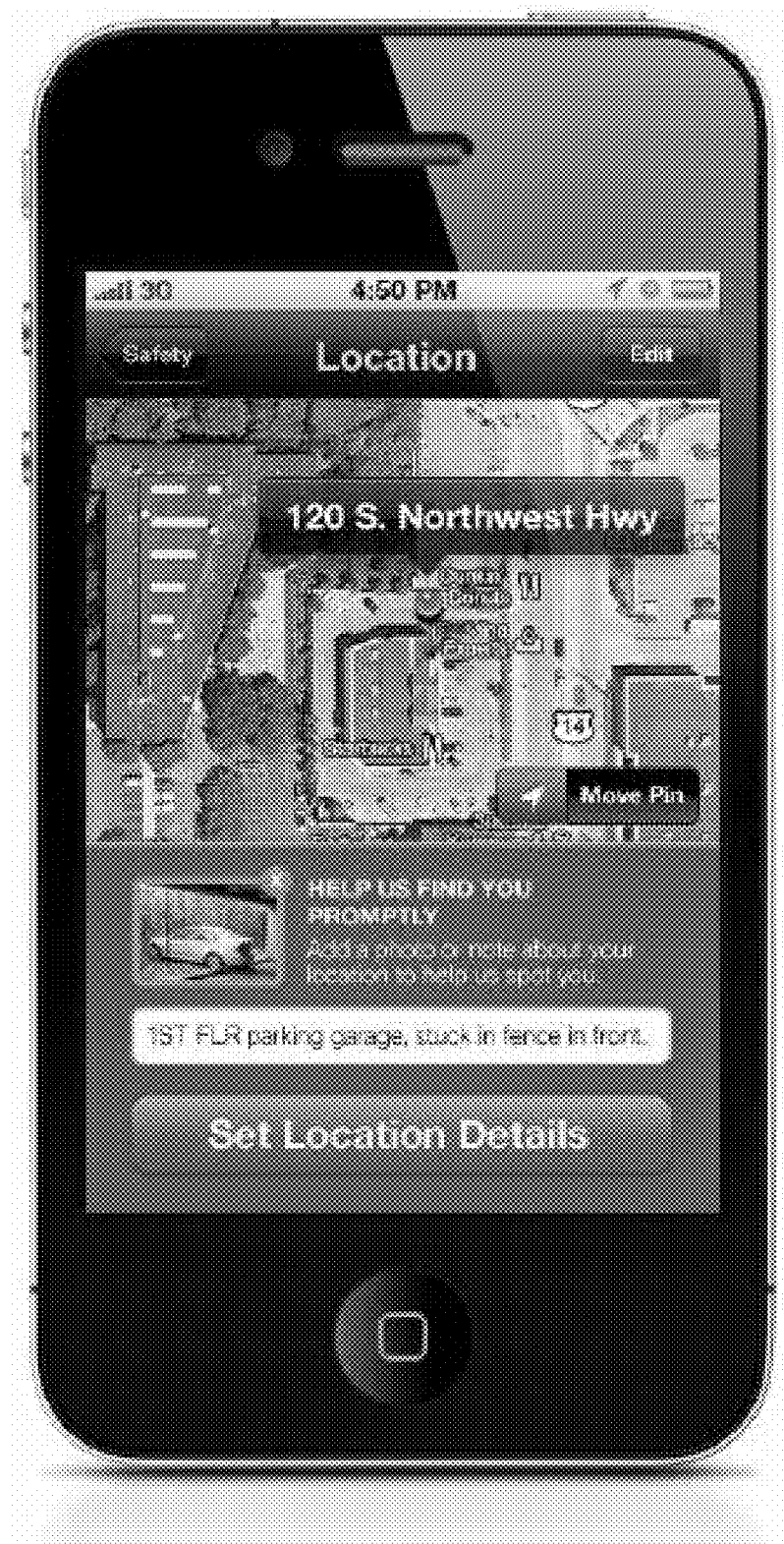

FIGS. 17-18 illustrate exemplary screenshots of an application that provides location information about a user's vehicle using satellite imagery in accordance with various aspects of the disclosure. As previously discussed with FIG. 14, location information about the user's vehicle may be provided to the service provider to, inter alia, expedite the arrival of a technician. With embodiments of the disclosure, a satellite image may be displayed to the user based on approximate location information, e.g., from a GPS integrated circuit in mobile device 704 (as shown in FIG. 7). Screen 1700 shows a corresponding satellite image, where the user may provide improved location information by moving pin 1701. In the example, the user may move pin 1701 so that location information is revised in screen 1800 as shown in FIG. 18, where the location changes from "115 S. Northwest Hwy" to "120 S. Northwest Hwy." Also, the user may provide a photograph of the vehicle through a camera of mobile device 704 and a note about the location ("$1^{ST}$ FLR Parking Garage, stuck in fence in front") As shown in FIG. 15, this additional information may be provided to the technician to expedite the technician's arrival and/or diagnosis.

Additional Information Provided by User.

Figure 19:
FIGS. 19-20 illustrate exemplary screenshots of an application enabling a user to provide information about a disablement event in accordance with various aspects of the disclosure.
Figure 20:
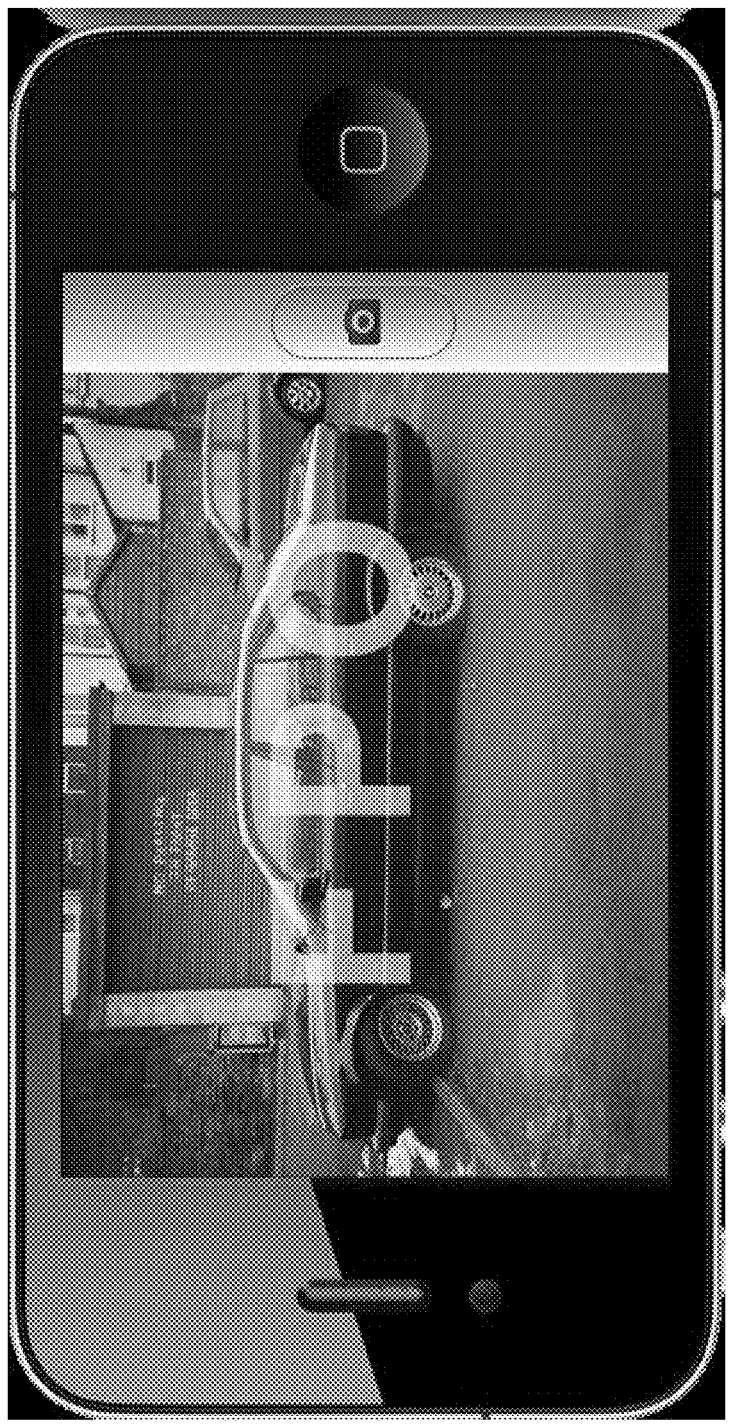

As previously discussed, a user (e.g., a customer, driver, etc.) may provide further information about the disablement event. For example, in addition to merely indicating a "flat tire" as shown in FIG. 6, the user may further indicate which tire is flat and whether the user has a spare tire as shown in FIG. 19. Also, as previously discussed, the user may send a video image of the vehicle as shown in FIG. 20.

Enhanced ETA Dashboard.

Figure 21:
FIG. 21 illustrate an exemplary screenshot of an application providing information such as an estimated time of arrival by a technician in accordance with various aspects of the disclosure.

In conjunction with the technician receiving additional information about the user and user vehicle, the user may receive additional information about the assigned technician. FIG. 21 illustrates an exemplary screenshot of an application executing on mobile device 704 in order to provide information such as an estimated time of arrival (ETA) of a technician at the user's vehicle in accordance with various aspects of the disclosure. As shown in screen 2100, screen 2100 may show information 2103 about the assigned technician, including a picture and name of the technician. In addition, the dashboard may show an estimated time of arrival 2101 as well as an ETA confidence level 2102. The ETA confidence level 2102 may be a numeric, alpha-numeric, symbolic, or graphic representation. For example, the ETA confidence level 2102 may be a red, yellow, or green graphical representation corresponding to bad, satisfactory, and excellent, respectively. In one example, the ETA confidence level 2102 may be based on the on-time percentage of the particular technician over a historical period of time (e.g., the last 6 months, the last 30 days, the last year, over all time, or some other time period). In another example, the confidence level 2102 may be based on user feedback and provided ratings. In yet another example, the confidence level 2102 may be provided by an input (e.g., high, medium, or low) from the assigned technician or may be affected by the technician's input. In yet another example, the confidence level 2102 may be based on a combination of the aforementioned, along with one or more other factors such a current traffic conditions.

With an aspect of the disclosure, the ETA on screen 2100 may be updated when the ETA changes. For example, the application executing at a computing device may revise the ETA when a technician at mobile device 703 incurs an unexpected delay or is assigned another roadside job.

The foregoing presents a simplified summary of the disclosure in order to provide a basic understanding of some aspects. It is not intended to identify key or critical elements of the invention or to delineate the scope of the invention. Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a tangible computer-readable medium (e.g., a CD-ROM, RAM, hard drive, flash memory, etc.) storing instructions to cause a processor to perform methods in accordance with aspects of the disclosure is contemplated.

Numerous trademarks and/or service marks have been used throughout this disclosure. These trademarks and/or service marks are owned by their respective companies.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

While some embodiments have been described with respect to specific examples, other embodiments include numerous variations and permutations of the above described systems and techniques.

We claim:

1. A method for supporting roadside assistance for a user at a user vehicle, the method comprising:
    sending, through a communications device at the user vehicle, a roadside assistance request, the roadside assistance request including user identification, location information, and a service type for the roadside assistance;
    receiving, though the communications device, a first response message, the first response message including a plurality of service providers based on at least one of the location information and the service type;
    displaying an output on a display device, the output indicative of the plurality of service providers;
    receiving first input data though an input device, the first input data indicative of a selected service provider from the plurality of service providers;
    sending, though the communications device, a second response message, the second response message indicative of the selected service provider; and
    generating a completion icon on the display device permitting the user to indicate that the a requested service has been satisfactorily completed by the selected service provider.

2. The method of claim 1 further comprising:
    receiving provider information about each of the plurality of service providers; and
    displaying the provider information about the plurality of service providers on the display device.

3. The method of claim 1 further comprising:
    receiving service information about the selected service provider.

4. The method of claim 3 further comprising:
    extracting a name, a telephone number, and an estimated time of arrival (ETA) of a service vehicle from the service information.

5. The method of claim 4 further comprising:
    receiving updates about the estimated time of arrival by the selected service provider at the user vehicle.

6. The method of claim 4 further comprising:
    displaying a representation of the telephone number of the selected service provider; and
    displaying a selectable icon, which when selected, initiates a call to the selected service provider through the communications device.

7. The method of claim 1 further comprising:
    obtaining second input data indicating successful completion of services provided by the selected service provider; and
    in response to the obtaining, sending an indication to authorize payment to the selected service provider.

8. The method of claim 7 further comprising:
    displaying, on the display device based on the second input data, the completion icon to permit the user to indicate a successful completion of the requested service.

9. The method of claim 1 further comprising:
    obtaining, by the communications device and from an on-board diagnostic system of the user vehicle, the service type for the roadside assistance request.

10. The method of claim 1 further comprising:
    displaying, at the display device, a list of service types; and
    receiving, through the input device, third input data indicative of the service type.

11. The method of claim 1 further comprising:
    sending, through the communications device, a completion message indicating the user has clicked on the completion icon and indicative of a successful completion of the requested service.

12. An apparatus supporting roadside assistance for a user at a user vehicle, the apparatus comprising:
    a communications device configured to send a roadside assistance request, wherein the roadside assistance request includes user identification, location information, and a service type for roadside assistance;
    the communications device configured to receive a first response, wherein the first response includes a plurality of service providers based on at least one of the location information and the service type;
a display device configured to display an output, wherein the output is indicative of the plurality of service providers;
an input device electrically coupled to the communications device and configured to receive first input data, wherein the first input data is indicative of a selected service provider from the plurality of service providers;
the communications device configured to send a second response message, wherein the second response message is indicative of the selected service provider;
the display device configured to display an icon permitting the user to indicate that service has been satisfactorily completed by the selected service provider; and
the communications device configured to obtain, from an on-board diagnostic system of the user vehicle, the service type for the roadside assistance request.

13. The apparatus of claim 12, wherein the display device generates the icon on the display device permitting the user to indicate that a requested service has been satisfactorily completed by the selected service provider.

14. The apparatus of claim 12, wherein the input device is configured to obtain second input data indicating successful completion of services provided by the selected service provider and in response to the obtaining, configured to send an indication to authorize payment to the selected service provider.

15. The apparatus of claim 14, wherein the display device is configured to display the icon to permit the user to indicate successful completion of services.

16. The apparatus of claim 15, wherein the communications device is configured to send a completion message indicative of when the user has clicked on the icon and indicative of the successful completion of the services.

17. The apparatus of claim 12, wherein the display device is configured to display a list of service types and the input device is configured to receive third input data indicative of the service type.

18. The apparatus of claim 12, wherein the display device is configured to display a representation of a telephone number of the selected service provider and the communications device is configured to initiate a call to the selected service provider.

19. A non-transitory computer-readable storage medium storing computer-executable instructions that, when executed, cause a processor at least to perform operations comprising:
sending, through a communications device at a user vehicle, a roadside assistance request, a roadside request including user identification, location information, and a service type for roadside assistance;
receiving, though the communications device, a first response, the first response including a plurality of service providers based on at least one of the location information and the service type;
displaying an output on a display device, the output indicative of the plurality of service providers;
receiving provider information about each of the plurality of service providers;
displaying the provider information about the plurality of service providers on the display device;
receiving first input data though an input device, the first input data indicative of a selected service provider from the plurality of service providers;
sending, though the communications device, a second response message, the second response message indicative of the selected service provider;
receiving, through the communications device, service information about the selected service provider;
extracting an estimated time of arrival (ETA) of a service vehicle from the service information;
generating an icon on the display device permitting a user to indicate that service has been satisfactorily completed by the selected service provider;
obtaining, through the input device, second input data indicating successful completion of services provided by the selected service provider; and
in response to the obtaining, sending, through the communications device, an indication to authorize payment to the selected service provider.

20. The non-transitory computer-readable storage medium of claim 19 further storing computer-executable instructions that, when executed, cause the processor at least to perform operations comprising:
obtaining, from an on-board diagnostic system of the user vehicle, the service type for the roadside assistance request; and
inserting the service type into the roadside assistance request.

* * * * *

UNITED STATES PATENT AND TRADEMARK OFFICE
CERTIFICATE OF CORRECTION

Page 1 of 2

PATENT NO. : 10,531,253 B1
APPLICATION NO. : 16/417040
DATED : January 7, 2020
INVENTOR(S) : Briggs et al.

It is certified that error appears in the above-identified patent and that said Letters Patent is hereby corrected as shown below:

On the Title Page

Column 1, Related U.S. Application Data, Line 1:
Delete "(60)" and insert --(62)--

In the Specification

Column 1, Brief Description of the Drawings, Line 58:
Delete "oft" and insert --of--

Column 4, Detailed Description, Line 65:
Before "or", insert --(--

Column 4, Detailed Description, Line 65:
Delete "(i.e.," and insert --((i.e.,--

Column 5, Detailed Description, Line 56:
Delete "OBDII" and insert --OBD II--

Column 5, Detailed Description, Line 60:
Delete "ODB II" and insert --OBD II--

Column 5, Detailed Description, Line 62:
Delete "ODB II" and insert --OBD II--

Column 5, Detailed Description, Line 62:
Delete "ODB II" and insert --OBD II--

Column 5, Detailed Description, Line 66:
Delete "ODB II" and insert --OBD II--

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,531,253 B1

Column 6, Detailed Description, Line 2:
Delete "ODB II" and insert --OBD II--

Column 6, Detailed Description, Line 3:
Delete "ODB II" and insert --OBD II--

Column 6, Detailed Description, Line 6:
Delete "ODB II" and insert --OBD II--

Column 6, Detailed Description, Line 43:
Delete "ODB II" and insert --OBD II--

Column 6, Detailed Description, Line 46:
Delete "ODB II" and insert --OBD II--

Column 6, Detailed Description, Line 63:
Delete "ODB II" and insert --OBD II--

Column 10, Detailed Description, Line 35:
Delete "ODB II" and insert --OBD II--

Column 13, Detailed Description, Line 22:
Delete "3'" and insert --$3^{rd}$--

Column 13, Detailed Description, Line 24:
Delete "3'" and insert --$3^{rd}$--